(12) United States Patent
Imaseki et al.

(10) Patent No.: US 7,294,422 B2
(45) Date of Patent: Nov. 13, 2007

(54) COOLING METHOD FOR FUEL CELL

(75) Inventors: Mitsuharu Imaseki, Kawachi-gun (JP); Takeshi Ushio, Utsunomiya (JP); Yoshirou Shimoyama, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/432,126

(22) Filed: May 10, 2006

(65) Prior Publication Data
US 2006/0204797 A1 Sep. 14, 2006

Related U.S. Application Data

(62) Division of application No. 10/272,345, filed on Oct. 15, 2002, now Pat. No. 7,070,873.

(30) Foreign Application Priority Data

Oct. 16, 2001 (JP) ............................. 2001-318158
Oct. 16, 2001 (JP) ............................. 2001-318159

(51) Int. Cl.
*H01M 8/04* (2006.01)

(52) U.S. Cl. ............................. 429/24; 429/13; 429/26

(58) Field of Classification Search ..................... None
See application file for complete search history.

(56) References Cited

U.S. PATENT DOCUMENTS 6,663,993 B2   12/2003  Imaseki et al.
6,673,482 B2    1/2004  Imazeki et al.
2001/0050191 A1* 12/2001  Ogawa et al. ............. 180/65.3
2002/0061426 A1*  5/2002  Imaseki et al. ............... 429/26

* cited by examiner

*Primary Examiner*—John S. Maples
(74) *Attorney, Agent, or Firm*—Lahive & Cockfield, LLP; Anthony A. Laurentano, Esq.

(57) ABSTRACT

A cooling method for a fuel cell using a heat exchanger is provided. The method comprises the steps of: providing an ion exchanger in a circulation system for the cooling fluid; decreasing ion concentration in the cooling fluid by circulating the cooling fluid through the fuel cell and the ion exchanger when the temperature of the cooling fluid is below a thermostat operating temperature; distributing a portion of the cooling fluid discharged from the fuel cell, mixing the portion of the cooling fluid returning from the heat exchanger with another portion of the cooling fluid whose ion concentration has been decreased in the previous step, and returning the cooling fluid mixture to the fuel cell, when the temperature of the cooling fluid is approaching the thermostat operating temperature; and cooling the fuel cell by circulating the cooling fluid through the fuel cell and the heat exchanger after the temperature of the cooling fluid reaches the thermostat operating temperature. By using this cooling method, the cooling fluid having a high conductivity is not distributed to the fuel cell.

3 Claims, 18 Drawing Sheets

COOLING METHOD FOR FUEL CELL

RELATED APPLICATIONS

This application is a Divisional application of U.S. patent application Ser. No. 10/272,345 filed Oct. 15, 2002, now U.S. Pat. No. 7,070,873, which claims priority to Japanese Patent Application No. 2001-318158 filed 16 Oct. 2001 and Japanese Patent Application No. 2001-318159 filed 16 Oct. 2001 in Japan. The contents of the aforementioned applications are hereby incorporated by reference.

BACKGROUND OF THE INVENTION

1. Field of the Invention

This invention relates to a cooling method for a fuel cell in which heat produced during power generation in the fuel cell is dissipated by circulating a cooling fluid and by using a heat exchanger.

2. Background Art

Some fuel cells mounted in fuel cell vehicles are formed by stacking a plurality of fuel cell units, each of which comprises: a solid polymer electrolyte membrane, such as a solid polymer ion-exchange membrane electrode or the like, sandwiched between an anode and a cathode; and a pair of conductive separators holding the solid polymer electrolyte membrane therebetween, wherein a fuel gas, e.g., hydrogen gas, is supplied to the anode of each of the separators and an oxidizing gas, e.g., oxygen-containing air, is supplied to the cathode of each of the separators so as to generate electric power. In this type of fuel cell, hydrogen ions produced at the anode by a catalytic reaction move to the cathode through the solid polymer electrolyte membrane, and react with oxygen at the cathode to generate electric power.

In this type of fuel cell, because heat is produced during power generation and because the temperature of the fuel cell should be maintained within an appropriate range, the fuel cell is cooled by flowing a cooling fluid through cooling fluid passages formed in the separators of each of the fuel cell units and by dissipating heat of the cooling fluid using a heat exchanger. In a case in which such a cooling system is employed, it is necessary to control the amount of heat dissipated in order to avoid excessive cooling of the fuel cell when the fuel cell is operated in a cold environment, or is being operated so as to generate a small amount of power. As one conventional heat dissipation control method, a method in which cooling fluid circuits are switched depending on temperature using a thermostat valve is known. In this method, the cooling fluid circuits are switched so as to circulate the cooling fluid in the fuel cell while detouring the cooling fluid around the heat exchanger when the temperature of the cooling fluid is in a low temperature zone, i.e., below a temperature at which the thermostat valve operates (hereinafter, this temperature is referred to as the thermostat operating temperature), and so as to circulate the cooling fluid in the fuel cell while also circulating it through the heat exchanger when the temperature of the cooling fluid is in a high temperature zone, i.e., above the thermostat operating temperature.

When such a cooling system in which the separators are directly cooled by the cooling fluid is employed, because the conductivity of the cooling fluid must be maintained to be low in order to prevent electrical leakage via the cooling fluid, the cooling fluid is made to flow through an ion exchanger or the like to remove ions contained in the cooling fluid so that the conductivity of the cooling fluid is maintained to be low.

However, in the system in which heat dissipation amount is controlled by switching the cooling fluid circuits using the thermostat valve, because the cooling fluid sits in the heat exchanger and in passages for circulating the cooling fluid through the heat exchanged when the cooling fluid circulates while detouring around the heat exchanger at low temperature, the conductivity of the sitting cooling fluid may be increased due to ions dissolved from the heat exchanger or the passages. If the conductivity of the cooling fluid sitting in the heat exchanger or the passages is increased under low temperature conditions, the cooling fluid which has been sitting in the heat exchanger and which has a high conductivity may flow into the fuel cell when the cooling fluid circuits are switched upon completion of warm up.

Conventionally, in order to avoid such a problem, the heat exchanger and circulation pipes for the cooling fluid were made of material from which only a small amount of ions may dissolve; however, the material restricts the shape or manufacturing method of the heat exchanger, whereby the heat exchanger could be large, heavy, and expensive. Alternatively, the inside of the heat exchanger or the like may be coated in order to suppress ion dissolution; however, ions may dissolve when the coating is degraded.

SUMMARY OF THE INVENTION

Based on the above circumstances, an object of the present invention is to provide a cooling method for a fuel cell in which increase in the conductivity of the cooling fluid is suppressed by applying an appropriate treatment to a portion of the cooling fluid when the thermostat operating temperature is approached.

A further object of the present invention is to provide a cooling method for a fuel cell in which the cooling fluid does not sit in the heat exchanger, and also to provide a cooling method in which increase in the conductivity of the cooling fluid is prevented even when the temperature of the cooling fluid is in a low range.

In order to achieve the above object, a first aspect of the present invention provides a cooling method for a fuel cell, in which heat produced during power generation in the fuel cell is dissipated by circulating a cooling fluid and by using a heat exchanger and a thermostat provided for switching flow passages of the cooling fluid depending on the temperature thereof, the method comprising the steps of: providing an ion exchanger, for removing ions contained in the cooling fluid, in a circulation system for the cooling fluid; decreasing ion concentration in the cooling fluid by circulating the cooling fluid through the fuel cell and the ion exchanger when the temperature of the cooling fluid is below a thermostat operating temperature at which the thermostat valve of the thermostat is operated; distributing a portion of the cooling fluid discharged from the fuel cell, mixing the portion of the cooling fluid returning from the heat exchanger with another portion of the cooling fluid whose ion concentration has been decreased in the previous step, and returning the cooling fluid mixture to the fuel cell, when the temperature of the cooling fluid is approaching the thermostat operating temperature; and cooling the fuel cell by circulating the cooling fluid through the fuel cell and the heat exchanger after the temperature of the cooling fluid reaches the thermostat operating temperature.

According to the above cooling method, even if ion concentration in the cooling fluid in the heat exchanger is increased when the temperature of the cooling fluid is below the thermostat operating temperature, it is possible to distribute the cooling fluid to the fuel cell after decreasing its ion concentration by mixing with another portion of the cooling fluid whose ion concentration has been decreased.

A second aspect of the present invention provides a cooling method for a fuel cell, in which heat produced during power generation in the fuel cell is dissipated by circulating a cooling fluid and by using a heat exchanger and a thermostat provided for switching flow passages of the cooling fluid depending on the temperature thereof, the method comprising the steps of: providing an ion exchanger, for removing ions contained in the cooling fluid, in a circulation system for the cooling fluid; removing ions contained in the cooling fluid by circulating the cooling fluid through the fuel cell and the ion exchanger when the temperature of the cooling fluid is below a thermostat operating temperature at which the thermostat valve of the thermostat is operated; removing ions contained in the cooling fluid in the heat exchanger by circulating a portion of the cooling fluid through the heat exchanger and the ion exchanger, when the temperature of the cooling fluid is approaching the thermostat operating temperature; and cooling the fuel cell by circulating the cooling fluid through the fuel cell and the heat exchanger after the temperature of the cooling fluid reaches the thermostat operating temperature.

According to the above cooling method, even if ion concentration in the cooling fluid in the heat exchanger is increased when the temperature of the cooling fluid is below the thermostat operating temperature, it is possible to decrease ion concentration in the cooling fluid containing a large number of ions by removing ions by the time the temperature of the cooling fluid reaches the thermostat operating temperature.

The method of the second aspect may further comprise the steps of: providing a conductivity sensor for measuring the conductivity of the cooling fluid; and stopping the step of removing ions contained in the cooling fluid in the heat exchanger by circulating a portion of the cooling fluid through the heat exchanger and the ion exchanger when the conductivity of the cooling fluid is decreased below a predetermined value.

According to the above cooling method, the cooling fluid is not distributed from the heat exchanger to the ion exchanger after the conductivity of the cooling fluid is decreased below a predetermined value; therefore, it is possible to increase the amount of the cooling fluid which is discharged from the heat exchanger and is distributed to the fuel cell.

A third aspect of the present invention provides a cooling method for a fuel cell, in which heat produced during power generation in the fuel cell is dissipated by circulating a cooling fluid and by using a heat exchanger and a first and second thermostats provided for switching flow passages of the cooling fluid depending on the temperature thereof, the method comprising the steps of: providing an ion exchanger, for removing ions contained in the cooling fluid, in a circulation system for the cooling fluid; removing ions contained in the cooling fluid by circulating the cooling fluid through the fuel cell and the ion exchanger when the temperature of the cooling fluid is below a first thermostat operating temperature at which the thermostat valve of the first thermostat is operated; removing ions contained in the cooling fluid in the heat exchanger by circulating a portion of the cooling fluid through the heat exchanger and the ion exchanger, when the temperature of the cooling fluid is above the first thermostat operating temperature and below a second thermostat operating temperature at which the thermostat valve of the second thermostat is operated; and cooling the fuel cell by circulating the cooling fluid through the fuel cell and the heat exchanger after the temperature of the cooling fluid reaches the second thermostat operating temperature.

According to the above cooling method, even if ion concentration in the cooling fluid in the heat exchanger is increased when the temperature of the cooling fluid is below the first thermostat operating temperature, it is possible to decrease ion concentration in the cooling fluid containing a large number of ions by removing ions by the time the temperature of the cooling fluid reaches the second thermostat operating temperature.

A fourth aspect of the present invention provides a cooling method for a fuel cell, in which heat produced during power generation in the fuel cell is dissipated by circulating a cooling fluid and by using a first heat exchanger, the method comprising the steps of: providing an ion exchanger, for removing ions contained in the cooling fluid, in a circulation system for the cooling fluid; removing ions contained in the cooling fluid in the first heat exchanger by circulating a portion of the cooling fluid through the first heat exchanger and the ion exchanger when the temperature of the cooling fluid is below a predetermined value; and cooling the fuel cell by circulating the cooling fluid through the fuel cell and the first heat exchanger when the temperature of the cooling fluid is above the predetermined value.

According to the above cooling method, because ions contained in the cooling fluid in the first heat exchanger are removed by circulating a portion of the cooling fluid through the first heat exchanger and the ion exchanger when the temperature of the cooling fluid is below the predetermined value, the cooling fluid does not sit in the first heat exchanger, and it is possible to decrease ion concentration in the cooling fluid in the first heat exchanger.

The method of the fourth aspect may further comprise the steps of: providing a counterflow type second heat exchanger between the first heat exchanger and the ion exchanger; and transferring heat from the cooling fluid pre-entering the first heat exchanger to the cooling fluid discharged from the first heat exchanger when the temperature of the cooling fluid is below the predetermined value.

According to the above cooling method, it is possible to suppress heat dissipation amount of the first heat exchanger even when a portion of the cooling fluid is circulated through the first heat exchanger and the ion exchanger when the temperature of the cooling fluid is below the predetermined value.

DETAILED DESCRIPTION OF THE PREFERRED EMBODIMENTS

The first to third embodiments of the cooling method for a fuel cell, according to the present invention, will be explained with reference to FIGS. 1 to 12. The cooling method for a fuel cell in each of the following embodiments will be explained as being applied to a fuel cell to be mounted in a fuel cell vehicle.

First Embodiment

The first embodiment of the cooling method for a fuel cell, according to the present invention, will be explained with reference to FIGS. 1 to 5.

Figure 1:
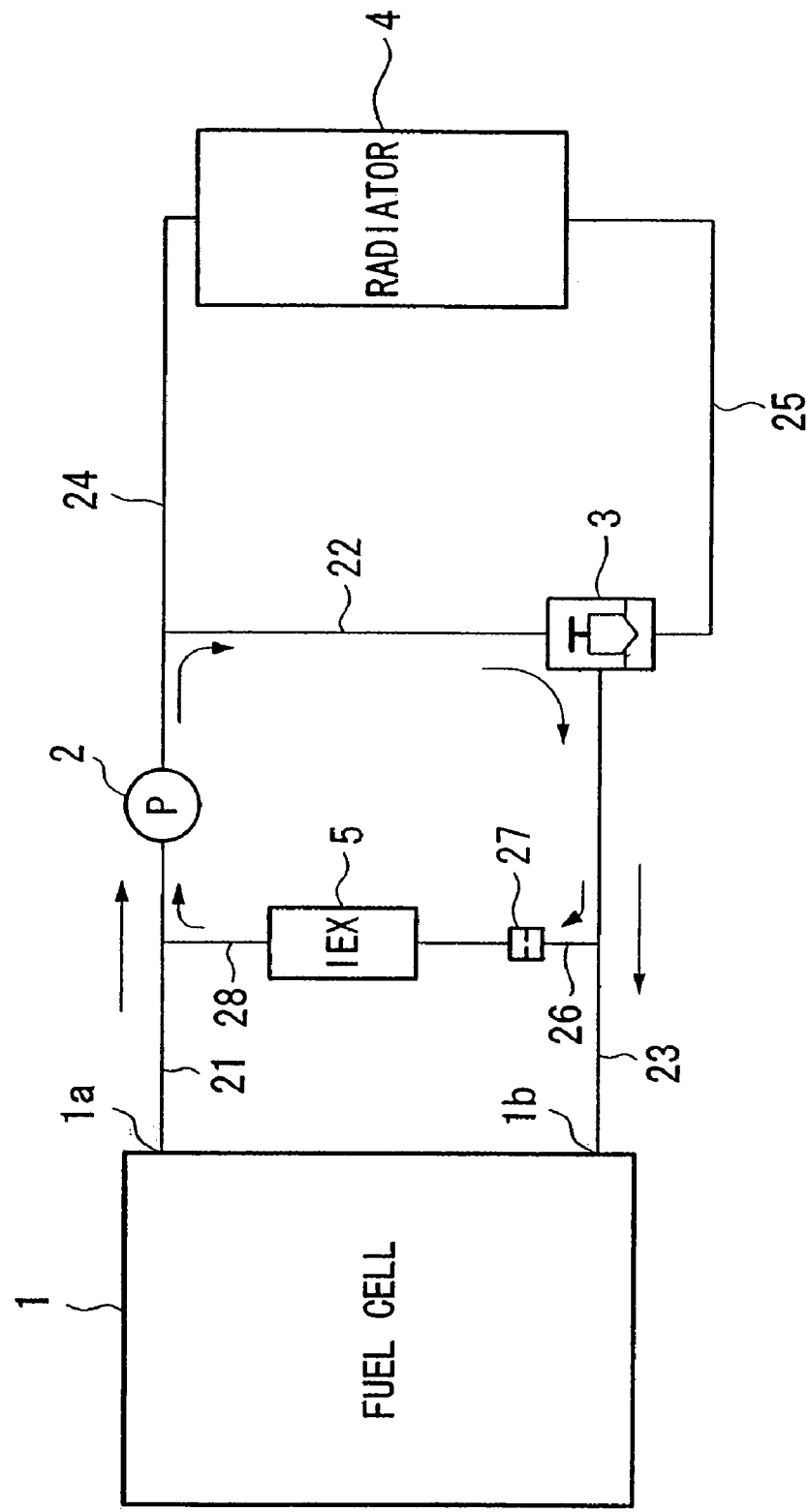
FIG. 1 is a system diagram showing a first embodiment of a fuel cell system to which the cooling method for a fuel cell according to the present invention is applicable, and specifically showing, as a first part, a flow state of the cooling fluid in a low temperature zone.
Figure 2:
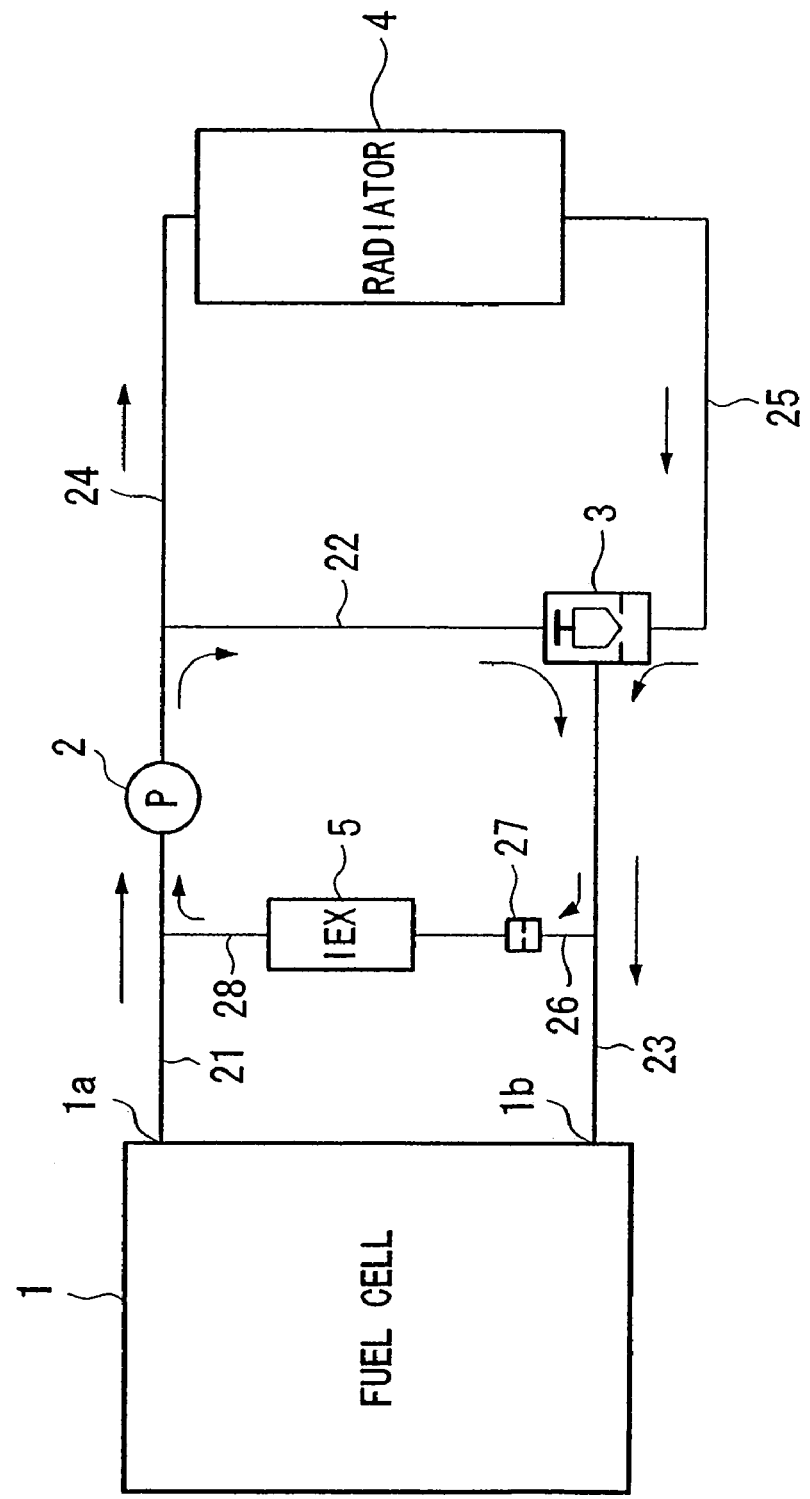
FIG. 2 is a system diagram showing the first embodiment of a fuel cell system, and specifically showing, as a second part, a flow state of the cooling fluid in the low temperature zone.
Figure 3:
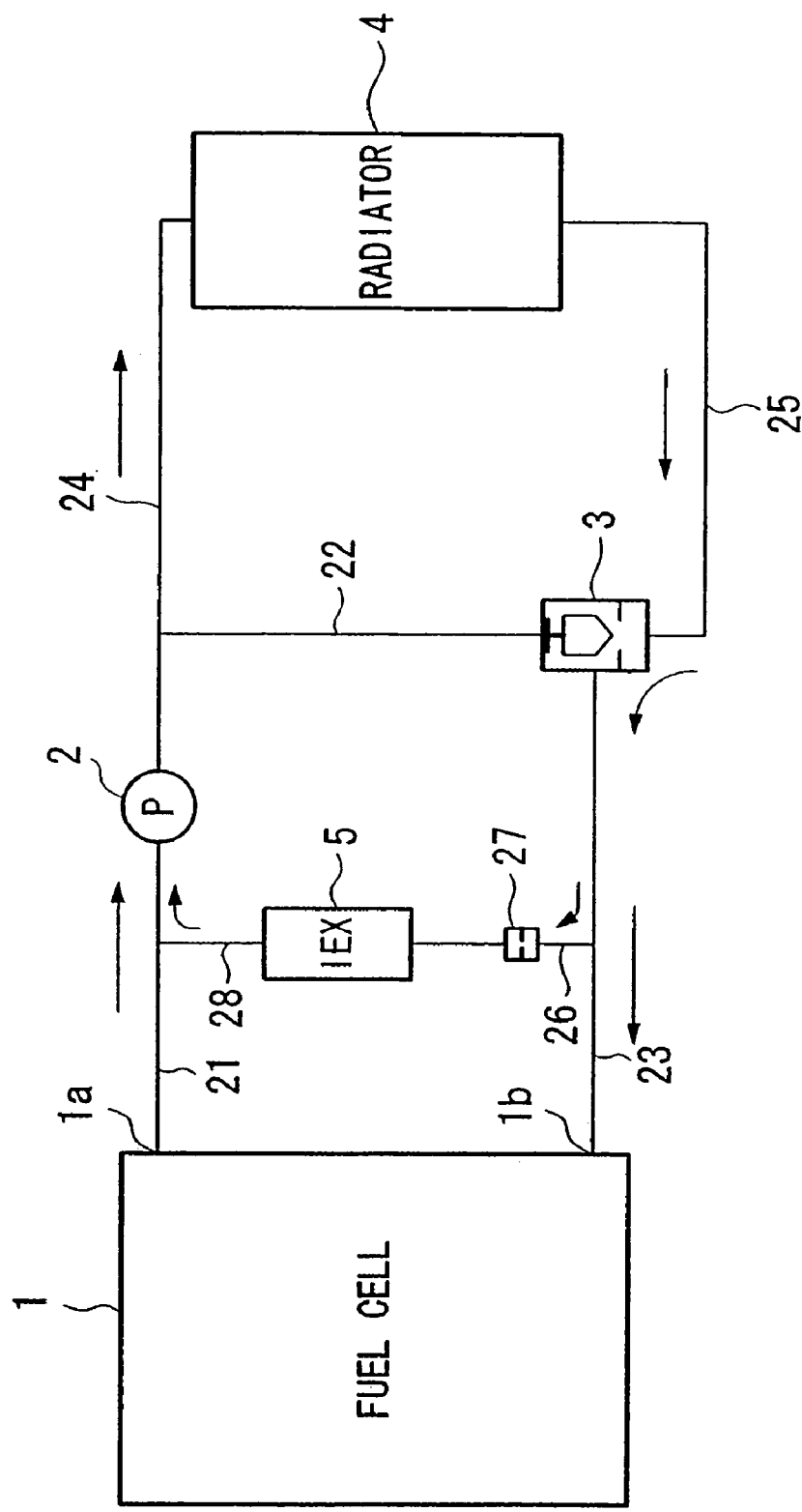
FIG. 3 is a system diagram showing the first embodiment of a fuel cell system, and specifically showing a flow state of the cooling fluid in a high temperature zone.

FIGS. 1 to 3 are schematic system diagrams showing a cooling system for a fuel cell mounted in a fuel cell vehicle.

A fuel cell 1 consists of a stack formed by stacking a plurality of fuel cell units, each of which comprises, for example: a solid polymer electrolyte membrane, such as a solid polymer ion-exchange membrane electrode or the like, sandwiched between an anode and a cathode; and a pair of separators holding the solid polymer electrolyte membrane therebetween. In the fuel cell 1, when hydrogen gas is supplied to the anode and oxygen-containing air is supplied to the cathode, hydrogen ions produced at the anode by a catalytic reaction move to the cathode through the solid polymer electrolyte membrane, and electrically and chemically react with oxygen at the cathode to generate electric power. In FIG. 1, the supply system and the discharge system for hydrogen gas and air are not shown.

In the fuel cell 1, cooling fluid passages are formed in the separators. The temperature of the fuel cell 1 is controlled so as to be maintained within a predetermined temperature range, e.g., from 70 to 80° C. after the fuel cell is warmed-up, by flowing a cooling fluid through the cooling fluid passages so as to directly cool the separators.

Next, a cooling fluid circulation system in which the cooling fluid flows will be explained. First, the cooling fluid circuit in a state, in which the cooling fluid for the fuel cell 1 requires no cooling because the temperature of the cooling fluid is low, i.e., the temperature of the cooling fluid is in a low temperature zone, will be explained. As shown in FIG. 1, the cooling fluid discharged from the cooling fluid passage outlet 1a of the fuel cell 1 is drawn by a cooling fluid pump 2 via a cooling fluid piping 21, flows into a thermostat valve 3 via a cooling fluid piping 22 after being pressurized by the cooling fluid pump 2, flows into the cooling fluid passage inlet 1b of the fuel cell 1 via a cooling fluid piping 23, flows through the cooling fluid passages in the fuel cell 1, and is again discharged from the cooling fluid passage outlet 1a to circulate.

Next, the cooling fluid circuit, in a state, in which the cooling fluid for the fuel cell 1 requires cooling because the temperature of the cooling fluid is high, i.e., the temperature of the cooling fluid is in a high temperature zone, will be explained.

As shown in FIG. 3, the cooling fluid discharged from the cooling fluid passage outlet 1a of the fuel cell 1 and pressurized by the cooling fluid pump 2 flows into a radiator 4 via a cooling fluid piping 24 branching from the cooling fluid piping 22. The radiator 4 is an air-cooled type heat exchanger in which the cooling fluid is cooled by heat dissipation using natural ventilation or forced draft by a fan. The cooling fluid cooled through the radiator 4 flows into the thermostat valve 3 via a cooling fluid piping 25, and flows into the cooling fluid passage inlet 1b of the fuel cell 1 via the cooling fluid piping 23 to circulate.

As shown in FIGS. 1 and 3, either when the temperature of the cooling fluid is in the low temperature zone, or when it is in the high temperature zone, a portion of the cooling fluid flowing through the cooling fluid piping 23 flows into an ion exchanger 5 via a cooling fluid piping 26 and an orifice 27. The ion exchanger 5 is filled with ion exchange resin in order to remove ions contained in the cooling fluid so as to decrease the conductivity of the cooling fluid. The orifice 27 is a regulating orifice which regulates the flow rate of the cooling fluid flowing into the ion exchanger 5 at a predetermined rate. The cooling fluid, from which ions have been removed by the ion exchanger 5, flows into the cooling fluid piping 23 via a cooling fluid piping 28, and is drawn by the cooling fluid pump 2 to circulate.

As explained above, in the first embodiment of the cooling fluid circulation system, either when the temperature of the cooling fluid is in the low temperature zone, or when in the high temperature zone, because a portion of the cooling fluid circulating through the fuel cell 1 always flows through the ion exchanger 5 which removes ions, it is possible to maintain the ion concentration in the cooling fluid circulating through the fuel cell 1 to be below a predetermined level; thus, the conductivity of the cooling fluid can be maintained to be below a predetermined level, and the electrical insulation performance of the cooling fluid in the fuel cell 1 can be ensured.

In the first embodiment of the cooling system, the cooling fluid circuit during the low temperature zone and the cooling fluid circuit during the high temperature zone are switched to each other using the thermostat valve 3. Now, the operation of the thermostat valve 3 for switching the cooling fluid circuit will be explained with reference to the schematic drawings, i.e., FIGS. 4A to 4C.

Figure 4A:
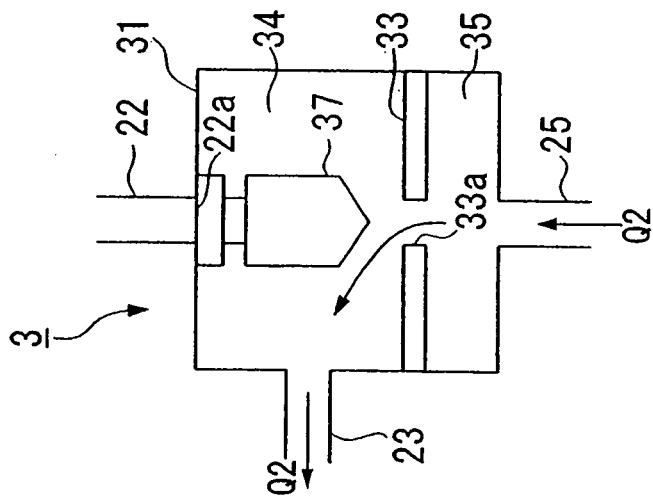
FIGS. 4A to 4C are diagrams showing the operation of a thermostat valve used in the first embodiment.

The thermostat valve 3 comprises: a housing 31 defining a valve chamber therein; a partition 33 dividing the valve chamber into two valve chambers, i.e., a first valve chamber 34 and a second valve chamber 35; and a valve body 37 operable to open or close a communication hole 33a formed in the partition 33, so as to connect or disconnect the first valve chamber 34 and the second valve chamber 35. In addition, the thermostat valve 3 has a thermostat (not shown) therein, which operates the valve body 37 in accordance with the temperature of the cooling fluid flowing through the valve chamber. The thermostat valve 3 operates as follows: the valve body 37 closes the communication hole 33a, as shown in FIG. 4A (hereinafter, this state is referred to as the completely closed state), when the temperature of the cooling fluid is below a temperature at which the thermostat operates (hereinafter simply referred to as the thermostat operating temperature), i.e., when the temperature of the cooling fluid is in the low temperature zone; and the valve body 37 is separated from the communication hole 33a, as shown in FIG. 4C (hereinafter, this state is referred to as the completely open state), when the temperature of the cooling fluid exceeds the thermostat operating temperature, i.e., when the temperature of the cooling fluid is in the high temperature zone. The thermostat will not be explained herein because it is well known.

Cooling fluid pipings 22 and 23 are connected to the first valve chamber 34, and a cooling fluid piping 25 is connected to the second valve chamber 35.

Accordingly, when the temperature of the cooling fluid is in the low temperature zone and the thermostat valve 3 is in the completely closed state as shown in FIG. 4A, the cooling fluid flows into the first valve chamber 34 through the cooling fluid piping 22, and flows out to the cooling fluid piping 23. In this state, the cooling fluid does not flow through the cooling fluid piping 25 because the cooling fluid piping 25 is closed at the second valve chamber 35.

On the other hand, when the temperature of the cooling fluid is in the high temperature zone and the thermostat valve 3 is in the completely open state as shown in FIG. 4C, the cooling fluid flows into the second valve chamber 35 through the cooling fluid piping 25, and flows out to the cooling fluid piping 23. In this state, the cooling fluid does not flow into the first valve chamber 34 through the cooling fluid piping 22 because the valve body 37 closes the inlet 22a from the cooling fluid piping 22 into the first valve chamber 34.

As explained above, the thermostat valve 3 switches the cooling fluid circuit in such a way that the valve body 37 operates so as to open or close the communication hole 33a and the inlet 22a from the cooling fluid piping 22.

When the temperature of the cooling fluid is in the low temperature zone, the cooling fluid circulates through the fuel cell 1 while detouring around the radiator 4, as mentioned above, and a portion of the cooling fluid sits in the radiator 4 and in the cooling fluid pipings 24 and 25. Therefore, in this state, ions may dissolve from the radiator 4 and the cooling fluid pipings 24 and 25, which leads to an increase in the ion concentration of the sitting cooling fluid, and leads to an increase in the conductivity thereof. Accordingly, the electrical insulation performance of the cooling fluid in the fuel cell 1 could be degraded because a large amount of cooling fluid, which has been sitting in the radiator 4 and in the cooling fluid pipings 24 and 25, and which has a high conductivity, flows into the cooling fluid passages in the fuel cell 1 through the cooling fluid piping 23 when the temperature of the cooling fluid transitions from the low temperature zone into the high temperature zone, and consequently the thermostat valve 3 instantaneously switches from the closed state to the open state.

As a countermeasure for the above problem, in the first embodiment, a predetermined temperature zone immediately below the thermostat operating temperature is set to be as a pre-operation temperature zone, and when the temperature of the cooling fluid is in the pre-operation temperature zone, a portion of the cooling fluid discharged from the fuel cell 1 is made to flow into the radiator 4, and the cooling fluid discharged from the radiator 4 is made to return to the fuel cell 1 after mixing with another portion of the cooling fluid which circulates detouring around the radiator 4 and which has a low ion concentration. As a result, an increase in the conductivity of the cooling fluid circulating through the fuel cell 1 can be prevented, or at least can be reduced to be within an acceptable level for the fuel cell 1. After the cooling fluid in the radiator 4 and in the cooling fluid pipings 24 and 25 is replaced by another portion of the cooling fluid having a low conductivity, the cooling fluid circuit is completely switched to a state in the high temperature zone as described above.

Figure 4C:
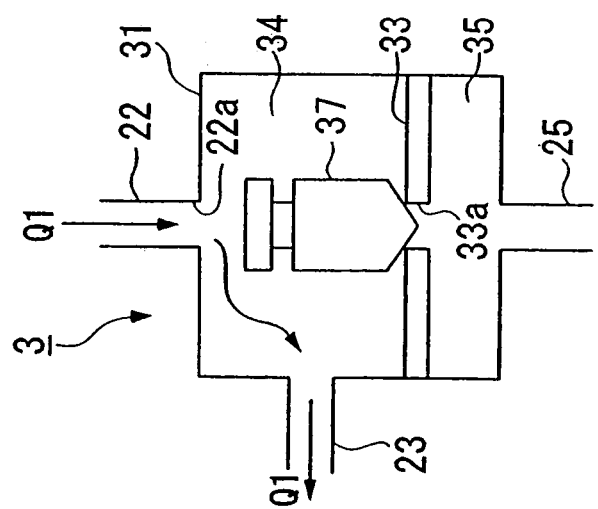
Figure 5:
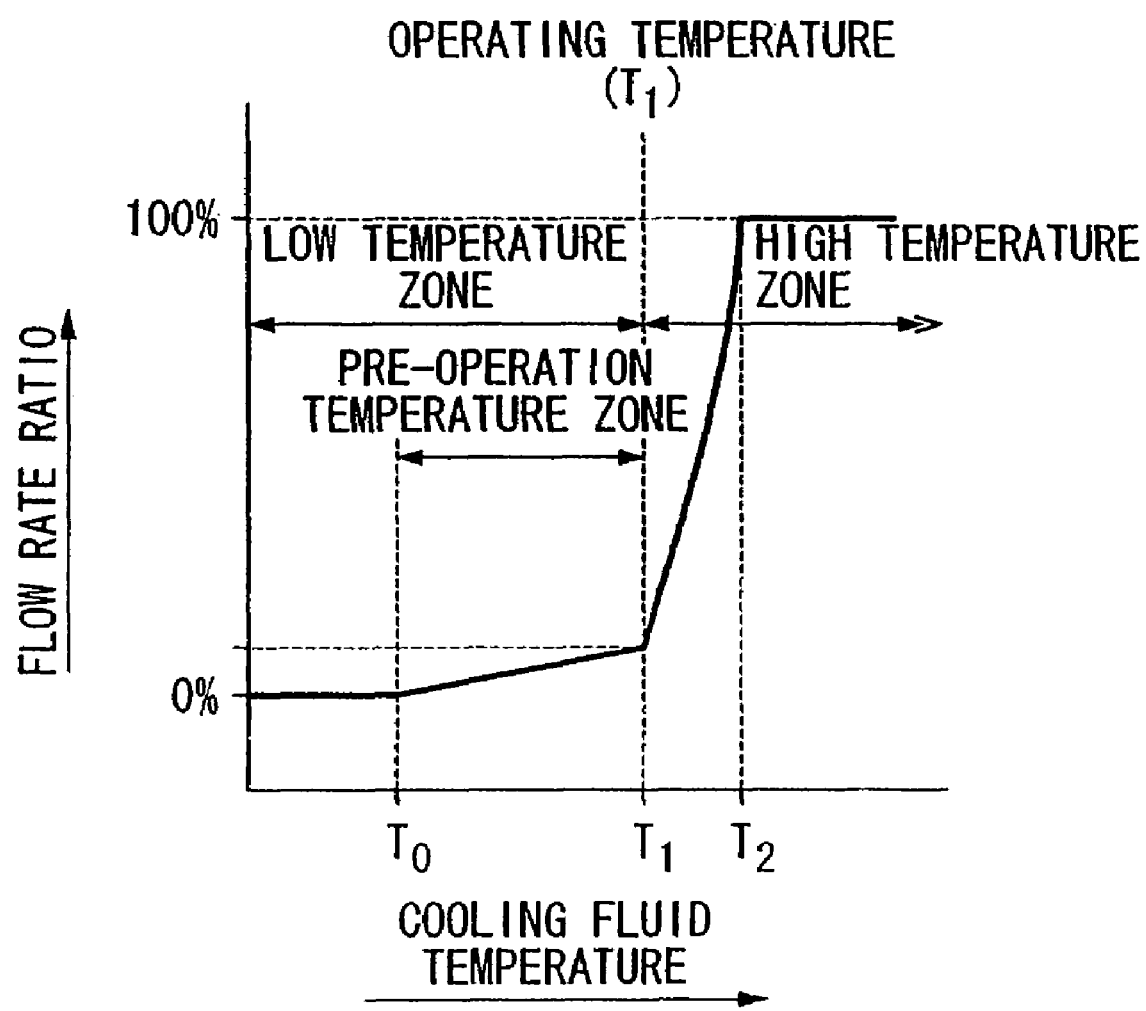
FIG. 5 a diagram showing the flow characteristics of the thermostat valve used in the first embodiment.

As a specific measure to realize the above operation, the thermostat valve 3 having the flow characteristics shown in FIG. 5 is used in the first embodiment. In FIG. 5 showing the flow characteristics, the horizontal axis indicates the temperature of the cooling fluid, and the vertical axis indicates a flow rate ratio (Q2/Q1) defined by the ratio between the flow rate Q1 of the cooling fluid flows into the first valve chamber 34 from the cooling fluid piping 22 and the flow rate Q2 of the cooling fluid flows into the second valve chamber 35 from the cooling fluid piping 25. In the completely closed state (Q2=0) shown in FIG. 4A, the flow rate ratio is shown as 0%, and in the completely open state (Q1=0) shown in FIG. 4C, the flow rate ratio is shown as 100%.

In the flow characteristics of thermostat valve 3, the thermostat operating temperature is set to T1, the low temperature zone is set to be below the thermostat operating temperature T1, the high temperature zone is set to be above the thermostat operating temperature T1, and the temperature zone from temperature T0, which is below the thermostat operating temperature T1 by a predetermined temperature, to the thermostat operating temperature T1 is set to be as the pre-operation temperature zone. The thermostat valve 3 starts to open when the temperature of the cooling fluid exceeds the temperature T0, the flow rate ratio gradually increases (for example, the flow rate ratio at T1 is about 10%) in the pre-operation temperature zone, the flow rate ratio rapidly increases above temperature T1, and the completely open state is reached at temperature T2 (T0<T1<T2).

Figure 4B:
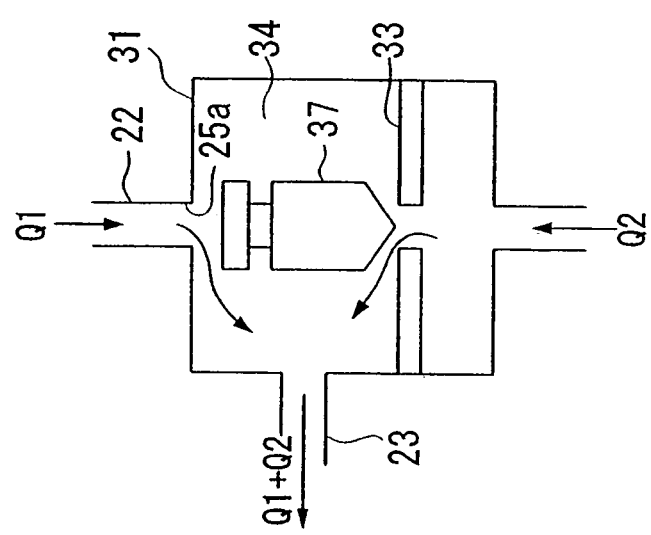

The thermostat valve 3 having the flow characteristics explained above operates in the pre-operation temperature zone in such a way that the valve body 37 is slightly away from the communication hole 33a so as to slightly open the communication hole 33a, and at the same time, the valve body 37 is sufficiently away from the inlet 22a from the cooling fluid piping 22 so as to widely open the inlet 22a, as shown in FIG. 4B. As a result, a portion of the cooling fluid flowing into the first valve chamber 34 from the cooling fluid piping 22 at a large flow rate and another portion of the cooling fluid flowing into the first valve chamber 34 from the cooling fluid piping 25 via the second valve chamber 35 at a small flow rate are mixed, and then the mixed cooling fluid flows out to the cooling fluid piping 23.

Accordingly, as the temperature of the cooling fluid rises from below temperature T0 toward the thermostat operating temperature T1, a portion of the cooling fluid, which has been circulating through the fuel cell while detouring around the radiator 4 when the temperature of the cooling fluid is below temperature T0, and which has a low ion concentration (for simplicity, hereinafter, this portion of the cooling fluid is referred to as the circulating cooling fluid at low temperature), is mixed with another portion of the cooling fluid, which has been sitting in the radiator 4 and in the cooling fluid pipings 24 and 25 when the temperature of the cooling fluid is below temperature T0, and which has a relatively high ion concentration (for simplicity, hereinafter, this portion of the cooling fluid is referred to as the sitting cooling fluid), as shown in FIG. 2; however, because the flow rate of the sitting cooling fluid remains low until the temperature of the cooling fluid reaches the thermostat operating temperature T1, the ion concentration of the mixed cooling fluid is only slightly higher than that of the circulating cooling fluid at low temperature; therefore, an increase in the conductivity of the cooling fluid circulating through the fuel cell 1 can be prevented, or at least it can be reduced to be within an acceptable level for the fuel cell 1.

In addition, during an operation in the pre-operation temperature, because a portion of the cooling fluid flowing through the cooling fluid piping 23 flows into the ion exchanger 5 via the cooling fluid piping 26, a portion of the mixed cooling fluid is subjected to ion removal by the ion exchanger before flowing into the fuel cell 1; therefore, the conductivity of the cooling fluid circulating through the fuel cell 1 can return to a low value within a short period.

If the flow characteristics of the thermostat valve 3 and the entire system are set so that the cooling fluid in the radiator 4 and in the cooling fluid pipings 24 and 25 is replaced by the circulating cooling fluid at low temperature when the temperature of the cooling fluid reaches the thermostat operating temperature T1, the cooling fluid having a low ion concentration, i.e., having a low conductivity, can be distributed to the fuel cell 1 immediately after the transition into the high temperature zone when the temperature of the cooling fluid transitions from the low temperature zone into the high temperature zone.

As explained above, according to the first embodiment of the cooling method for a fuel cell, the electrical insulation performance of the cooling fluid in the fuel cell 1 can always be maintained within an acceptable range, regardless of the temperature of the cooling fluid.

Second Embodiment

Next, the second embodiment of the cooling method for a fuel cell, according to the present invention, will be explained with reference to FIGS. 6 to 9.

FIGS. 6 to 9 are schematic system diagrams showing a cooling system for a fuel cell in the second embodiment.

The features in the second embodiment of the cooling system for a fuel cell which are different from that in the first embodiment will be explained below.

Figure 9:
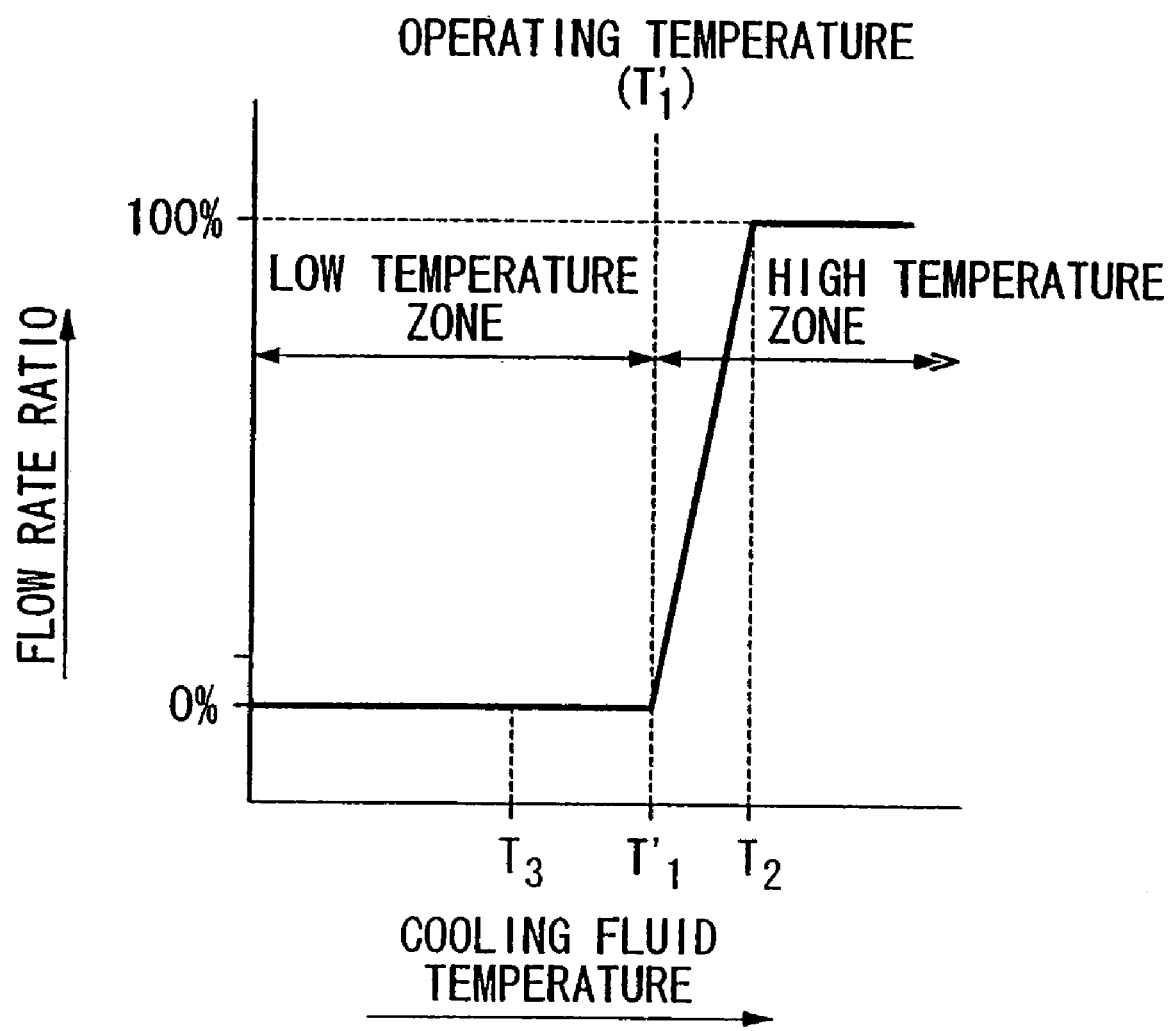
FIG. 9 a diagram showing the flow characteristics of the thermostat valve used in the second embodiment.

In the second embodiment, the thermostat valve 3 has the flow characteristics shown in FIG. 9. In the flow characteristics of thermostat valve 3, the thermostat operating temperature is set to T1', the low temperature zone is set to be below the thermostat operating temperature T1', the high temperature zone is set to be above the thermostat operating temperature T1', and the pre-operation temperature zone is not provided. Therefore, the thermostat valve 3 immediately switches from the completely closed state to the completely open state when the temperature of the cooling fluid exceeds the thermostat operating temperature T1'.

On the other hand, a slightly upstream point, as viewed from the thermostat valve 3, on the cooling fluid piping 25 and a point, between the orifice 27 and the ion exchanger 5, on the cooling fluid piping 26, is connected by a cooling fluid piping 41 provided with an open/close valve 6.

In addition, a temperature sensor 7, measuring the temperature of the cooling fluid flowing into the cooling fluid passage inlet 1b of the fuel cell 1, is provided at a slightly upstream point, as viewed from the thermostat valve 3, on the cooling fluid piping 23. The open/close valve 6 is controlled in accordance with the temperature of the cooling fluid measured by the temperature sensor 7. More specifically, the open/close valve 6 is controlled to be closed when the temperature of the cooling fluid measured by the temperature sensor 7 is below temperature T3, and the open/close valve 6 is controlled to open when the temperature of the cooling fluid measured by the temperature sensor 7 exceeds temperature T3. Temperature T3 is set to be below the thermostat operating temperature T1' by a predetermined temperature (T3<T1'<T2).

Other features are the same as in the first embodiment; therefore, the same reference symbols are appended to the same elements, and explanations thereof are omitted.

Next, the cooling method for a fuel cell according to the second embodiment will be explained.

As in the first embodiment, when the temperature of the cooling fluid is in the low temperature zone, the cooling fluid circulates through the fuel cell 1 while detouring around the radiator 4, as mentioned above, and a portion of the cooling fluid sits in the radiator 4 and in the cooling fluid pipings 24 and 25, in the second embodiment. Therefore, in this state, ions may dissolve from the radiator 4 and the cooling fluid pipings 24 and 25, which leads to an increase in the ion concentration of the sitting cooling fluid, and leads to an increase in the conductivity thereof. Accordingly, the electrical insulation performance of the cooling fluid in the fuel cell 1 may be degraded because a large amount of cooling fluid, which has been sitting in the radiator 4 and in the cooling fluid pipings 24 and 25, and which has a high conductivity, flows into the cooling fluid passages in the fuel cell 1 through the cooling fluid piping 23 when the temperature of the cooling fluid transitions from the low temperature zone into the high temperature zone, and consequently the thermostat valve 3 instantaneously switches from the closed state to the open state.

As a countermeasure for the above problem, in the second embodiment, when the temperature of the cooling fluid approaches the thermostat operating temperature T1', i.e., before the temperature of the cooling fluid reaches the thermostat operating temperature T1', a portion of the cooling fluid is made to circulate through the radiator 4 and the ion exchanger 5 so as to remove ions contained in the cooling fluid which has been sitting in the radiator 4 and in the cooling fluid pipings 24 and 25, and which has a high conductivity, by the ion exchanger 5, and to decrease the ion concentration thereof; and then the cooling fluid circuit is switched to the state in the high temperature zone.

As a specific measure to realize the above operation, one thermostat valve 3 and the open/close valve 6 are used in the second embodiment.

The flow of the cooling fluid will be explained below in accordance with the change in the temperature of the cooling fluid with reference to FIGS. 6 to 9.

Figure 6:
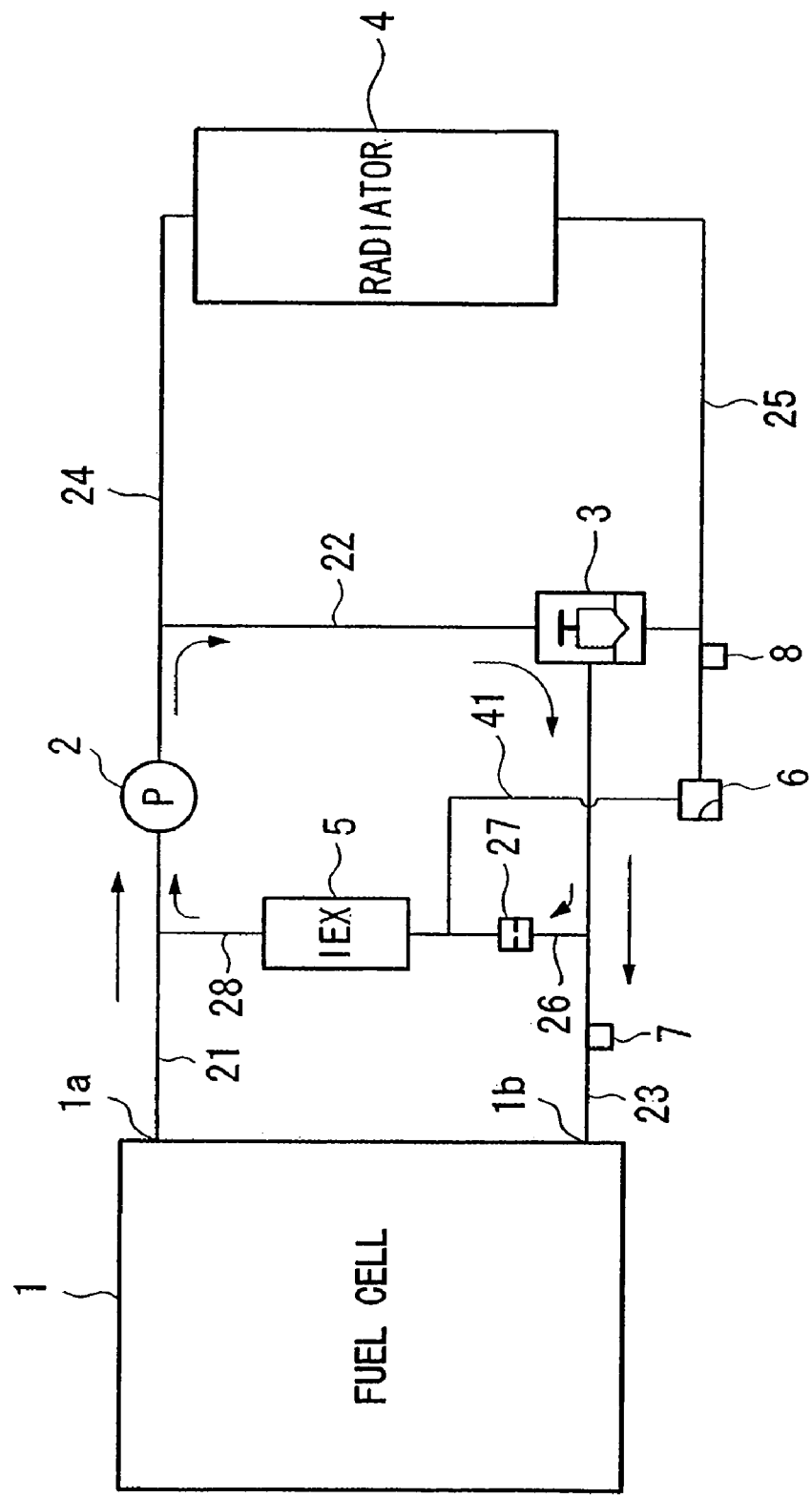
FIG. 6 is a system diagram showing a second embodiment of a fuel cell system to which the cooling method for a fuel cell according to the present invention is applicable, and specifically showing, as a first part, a flow state of the cooling fluid in a low temperature zone.

FIG. 6 shows the flow of the cooling fluid when the temperature of the cooling fluid is in the low temperature zone and below temperature T3. In this state, both the thermostat valve 3 and the open/close valve 6 are in the completely closed state. Accordingly, the cooling fluid circulates in the cooling fluid circuit in the low temperature zone. The cooling fluid circuit in the low temperature zone is the same as in the first embodiment, and the cooling fluid flows from the cooling fluid passage outlet 1a of the fuel cell 1, through the cooling fluid piping 21, through the cooling fluid pump 2, through the cooling fluid piping 22, through the thermostat valve 3, through the cooling fluid piping 23, through the cooling fluid passage inlet 1b of the fuel cell 1, and through the fuel cell 1, while a portion of the cooling fluid flows through the cooling fluid piping 26, through the orifice 27, through the ion exchanger 5, and through the cooling fluid piping 28.

Figure 7:
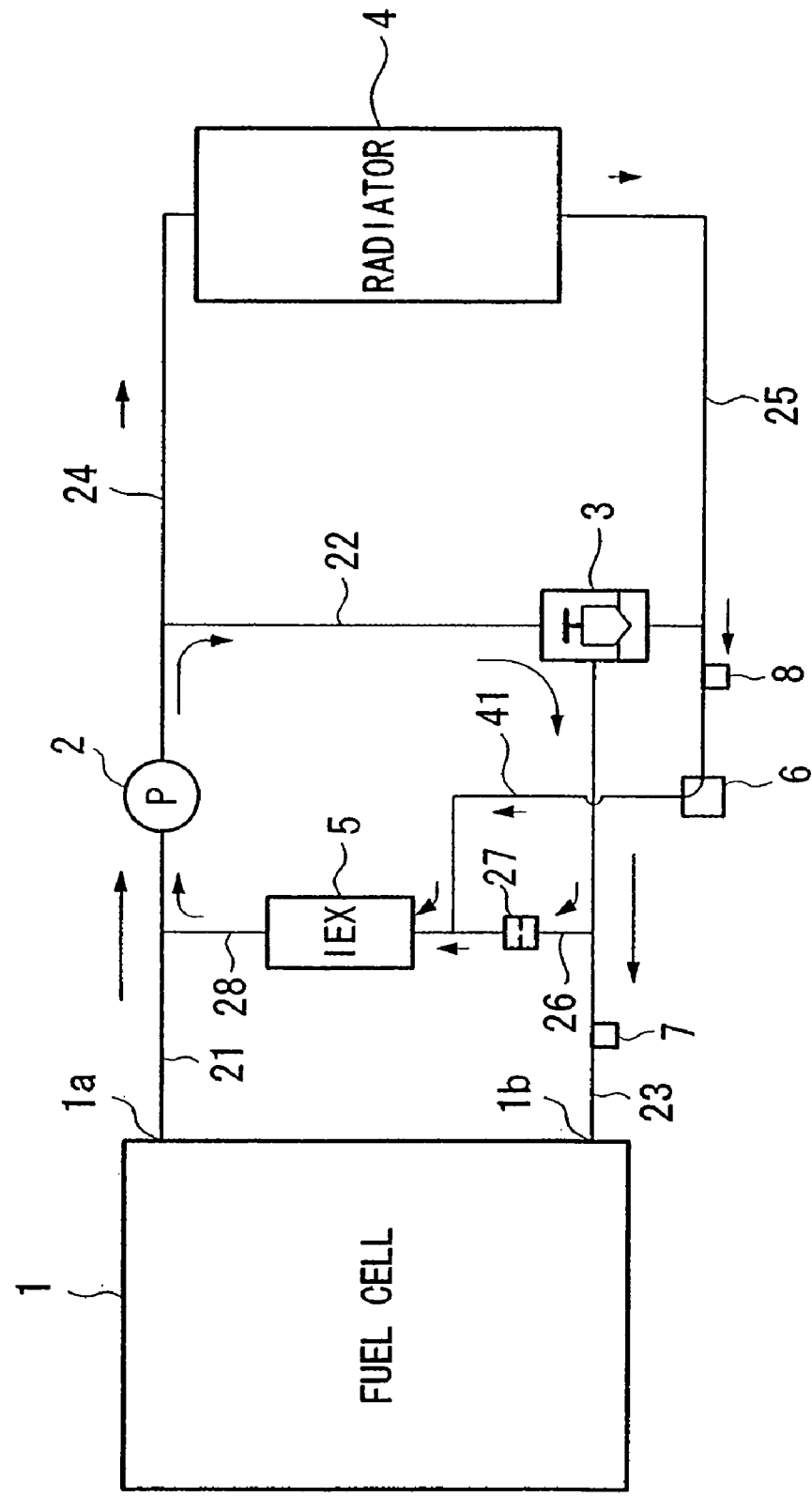
FIG. 7 is a system diagram showing the second embodiment of a fuel cell system, and specifically showing, as a second part, a flow state of the cooling fluid in the low temperature zone.

When the temperature of the cooling fluid is in the low temperature zone, and it exceeds the temperature T3 and is below the thermostat operating temperature T1', the thermostat valve 3 is maintained in the completely closed state, and only the open/close valve 6 transitions to the open state. Upon opening of the open/close valve 6, the cooling fluid circulates in the cooling fluid circuit in the low temperature zone, while a portion of the cooling fluid flowing into the cooling fluid piping 22 starts to flow through the cooling fluid piping 24, and through the radiator 4, as shown in FIG. 7. As a result, the cooling fluid, which has been sitting in the radiator 4 and in the cooling fluid pipings 24 and 25 before the open/close valve 6 opens, and which has a relatively high ion concentration, flows to an upstream point, as viewed from the ion exchanger 5, on the cooling fluid piping 26 through the open/close valve 6 and through the cooling fluid piping 41, and is mixed with another portion of the cooling fluid with a low ion concentration flowing through the cooling fluid piping 23, through the cooling fluid piping 26, and into the ion exchanger 5 in which ions contained in the mixed cooling fluid are removed. Accordingly, it is possible to decrease the ion concentration in the cooling fluid, which has been sitting in the radiator 4 and in the cooling fluid pipings 24 and 25 before the open/close valve 6 opens, and which has a relatively high ion concentration, while preventing the cooling fluid with a high ion concentration from flowing into the fuel cell 1.

Advantageously, the operating temperature T3 of the open/close valve 6 is set to be an appropriate value, the flow rate of the cooling fluid flowing through the cooling fluid piping 41 is set to be an appropriate value, and a flow restriction device, such as an orifice, is provided on the cooling fluid piping 41, if necessary, so that the cooling fluid in the radiator 4 and in the cooling fluid pipings 24 and 25 is completely replaced before the temperature of the cooling fluid reaches the thermostat operating temperature T1'.

Figure 8:
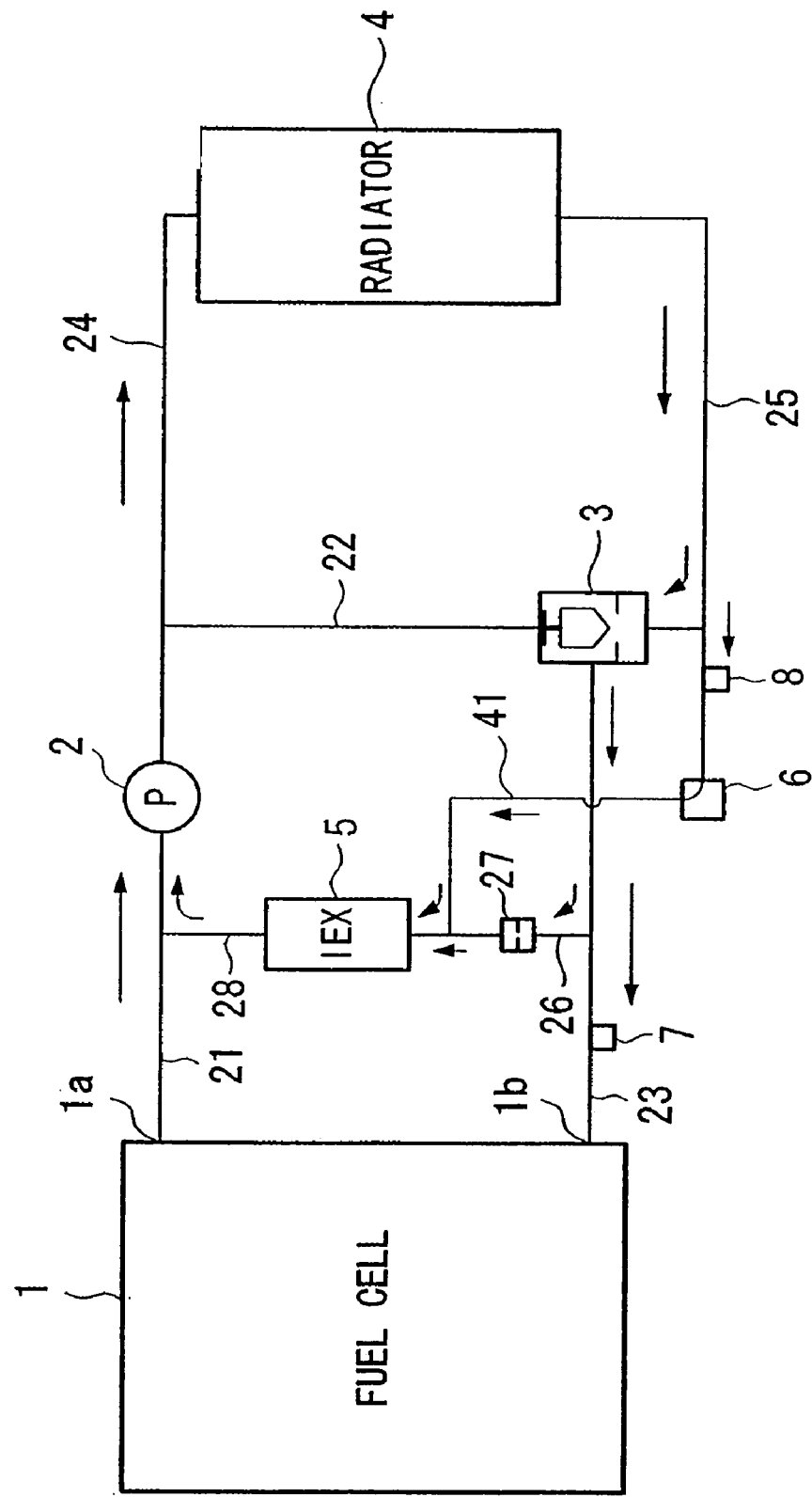
FIG. 8 is a system diagram showing the second embodiment of a fuel cell system, and specifically showing a flow state of the cooling fluid in a high temperature zone.

When the temperature of the cooling fluid exceeds the thermostat operating temperature T1', the thermostat valve 3 starts to open, and when the temperature of the cooling fluid exceeds the temperature T3, the thermostat valve 3 transitions to the completely open state. During this transition operation, the open/close valve 6 is maintained in the open state. FIG. 8 shows the flow state of the cooling fluid in this state in which the cooling fluid circulates through the cooling fluid circuit in the high temperature zone. The cooling fluid circuit in the high temperature zone is the same as in the first embodiment, and the cooling fluid flows from the cooling fluid passage outlet 1a of the fuel cell 1, through the cooling fluid piping 21, through the cooling fluid pump 2, through the cooling fluid piping 22, through the cooling fluid piping 24, through the radiator 4, through the cooling fluid piping 25, through the thermostat valve 3, through the cooling fluid piping 23, through the cooling fluid passage inlet 1b of the fuel cell 1, and through the fuel cell 1, while a portion of the cooling fluid flows through the cooling fluid piping 26, through the orifice 27, through the ion exchanger 5, and through the cooling fluid piping 28. Because the open/close valve 6 opens, a portion of the cooling fluid flowing through the cooling fluid piping 25 flows to the ion exchanger 5 via the cooling fluid piping 41 and the open/close valve 6.

When the cooling fluid starts to flow though the cooling fluid circuit in the high temperature zone, the cooling fluid in the radiator 4 and the cooling fluid in the cooling fluid pipings 24 and 25 have a low ion concentration, and the entire cooling fluid circuit contains the cooling fluid having a low ion concentration; therefore, the cooling fluid having a low ion concentration, i.e., having a low conductivity, can be distributed to the fuel cell 1 immediately after the temperature of the cooling fluid transitions into the high temperature zone.

Thus, according to the second embodiment of the cooling method for a fuel cell, the electrical insulation performance of the cooling fluid in the fuel cell 1 can always be maintained within an acceptable range, regardless of the temperature of the cooling fluid.

In the second embodiment, the open/close valve 6 is maintained in the open state, and a portion of the cooling fluid flowing through the cooling fluid pipings 24 and 25 is maintained to be distributed to the ion exchanger 5 when the temperature of the cooling fluid exceeds the thermostat operating temperature T1', i.e., transitions into the high temperature zone; however, it is not necessary to distribute the cooling fluid to the ion exchanger 5 via the cooling fluid piping 41 after the ion concentration, or the conductivity, of the cooling fluid discharged from the radiator 4, decreases below a predetermined value.

Therefore, a conductivity sensor 8 measuring the conductivity of the cooling fluid flowing through the cooling fluid pipings 24 and 25 may be provided at an upstream point, as viewed from the open/close valve 6, on the cooling fluid piping 41 so that the open/close valve 6 is closed, and so that the ion removing treatment by circulating the cooling fluid through the radiator 4 and the ion exchanger 5, when the conductivity of the cooling fluid measured by the conductivity sensor 8 decreases below a predetermined value. According to this measure, it is possible to decrease the amount of the cooling fluid which has been cooled by the radiator 4, and which flows detouring around the fuel cell 1. In other words, more cooling fluid which has been cooled by the radiator 4 can be distributed to the fuel cell 1; therefore, the fuel cell 1 can be more effectively cooled.

Third Embodiment

Figure 11:
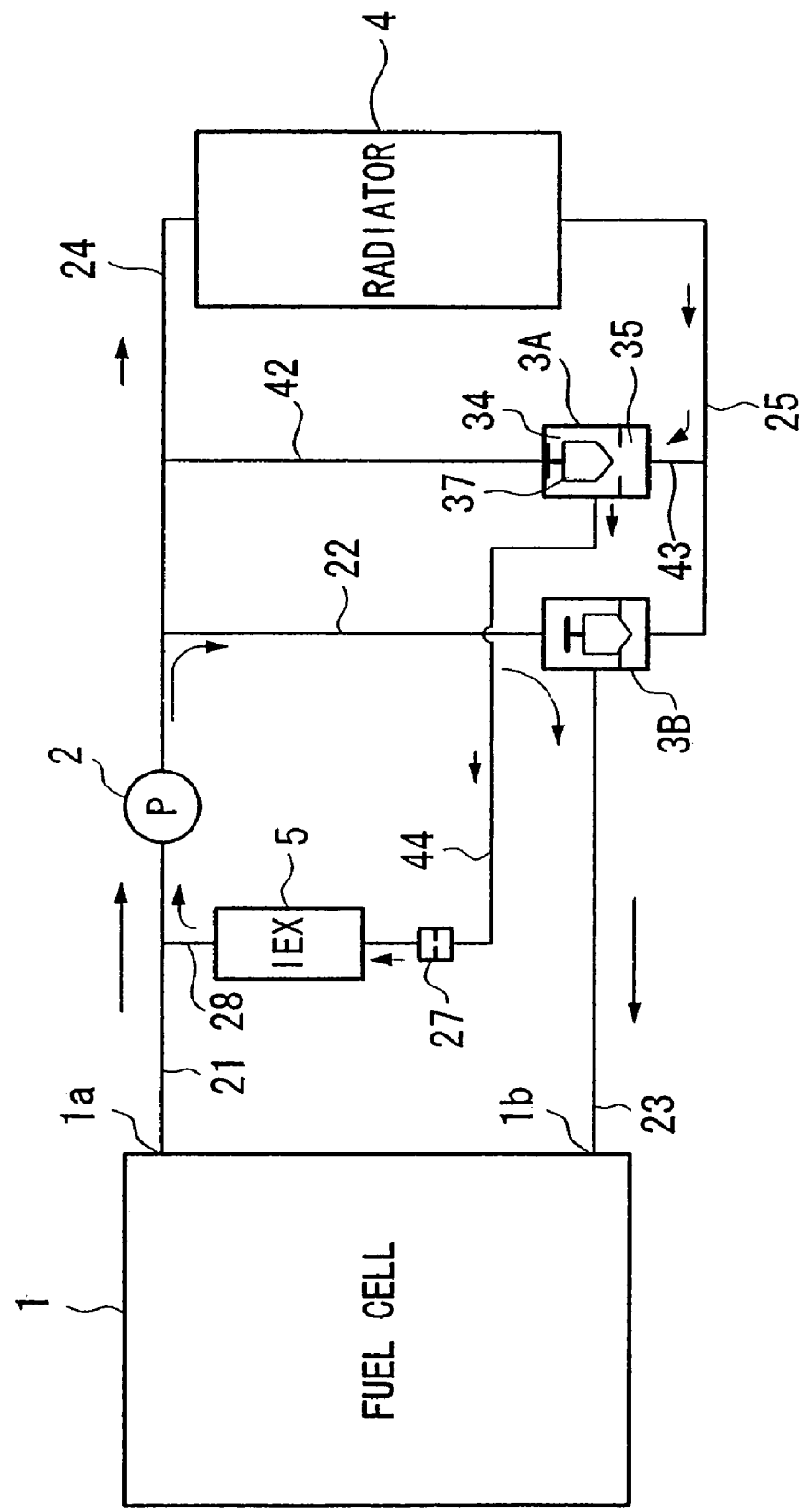
FIG. 11 is a system diagram showing the third embodiment of a fuel cell system, and specifically showing, as a second part, a flow state of the cooling fluid in the low temperature zone.
Figure 12:
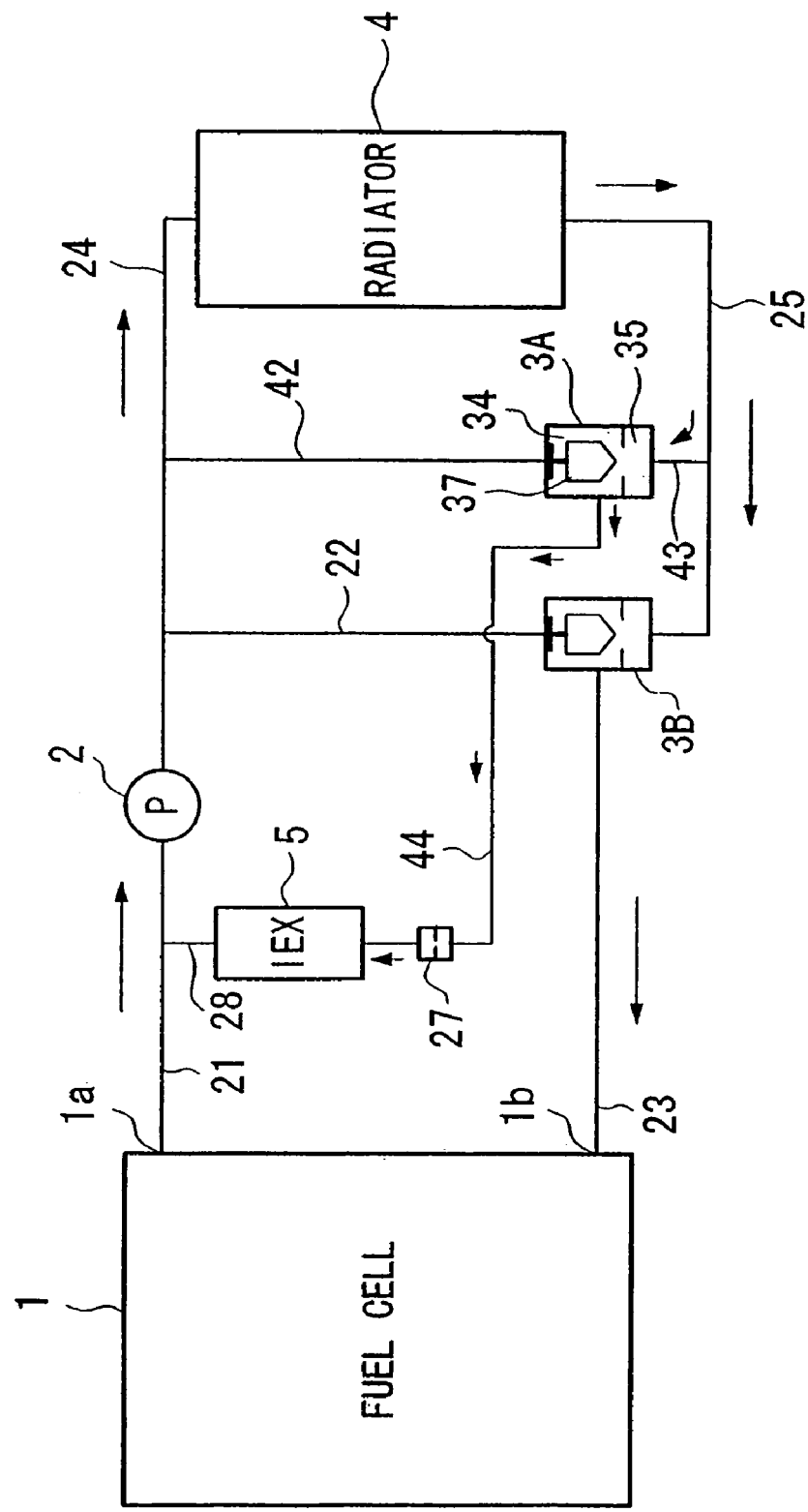
FIG. 12 is a system diagram showing the third embodiment of a fuel cell system, and specifically showing a flow state of the cooling fluid in a high temperature zone.

Next, the third embodiment of the cooling method for a fuel cell, according to the present invention, will be explained with reference to FIGS. 10 to 12. The basic concept of the third embodiment of the cooling method for a fuel cell is the same as that in the second embodiment, and these embodiments differ from each other in their specific measures.

In the third embodiment, as in the second embodiment, when the temperature of the cooling fluid approaches the thermostat operating temperature T1', i.e., before the temperature of the cooling fluid reaches the thermostat operating temperature T1', a portion of the cooling fluid is made to circulate through the radiator 4 and the ion exchanger 5 so as to remove ions contained in the cooling fluid which has been sitting in the radiator 4 and in the cooling fluid pipings 24 and 25, and which has a high conductivity, by the ion exchanger 5, and to decrease the ion concentration thereof; and then the cooling fluid circuit is switched to the state in the high temperature zone; however, as a specific measure to realize the above operation, two thermostat valves, i.e., a first thermostat valve 3A and a second thermostat valve 3B, whose thermostat operating temperatures differ from each other, are used in the third embodiment.

The features in the third embodiment of the cooling system for a fuel cell which are different from those in the first embodiment will be explained with reference to FIGS. 10 to 12. The same reference symbols are appended to the same elements in the second embodiment, and explanations therefor are omitted.

The second thermostat valve 3B is equivalent to the thermostat valve 3 in the second embodiment. As in the second embodiment, the second thermostat valve 3B is connected to the cooling fluid piping 22 disposed downstream of the cooling fluid pump 2, to the cooling fluid piping 25 disposed downstream of the radiator 4, and to the cooling fluid piping 23 connected to the cooling fluid inlet 1b of the fuel cell 1.

The cooling fluid piping 24 disposed upstream of the radiator 4 is connected to the first valve chamber 34 of the first thermostat valve 3A via the cooling fluid piping 42, and the cooling fluid piping 25 disposed downstream of the radiator 4 is connected to the second valve chamber 35 of the first thermostat valve 3A via the cooling fluid piping 43. The first valve chamber 34 of the first thermostat valve 3A is connected to the ion exchanger 5 via the cooling fluid piping 44 having the orifice 27. In the first thermostat valve 3A, the cooling fluid piping 44 out of the cooling fluid pipings 42 and 44 connected to the first valve chamber 34 is opened or closed by the valve body 37.

Although the thermostat operating temperature T1b' (the second thermostat operating temperature) of the second thermostat valve 3B is the same as that of the thermostat valve 3 in the second embodiment, the thermostat operating temperature T1a' (the first thermostat operating temperature) of the first thermostat valve 3A is set to be lower than the thermostat operating temperature T1b' of the second thermostat valve 3B (T1a'<T1b').

In the cooling system constructed as described above the second thermostat valve 3B operates to switch the cooling fluid circuit from one in the low temperature zone to the other in the high temperature zone, and the first thermostat valve 3A functions as the open/close valve 6 and the temperature sensor 7 in the second embodiment.

The flow of the cooling fluid will be explained below in accordance with the change in the temperature of the cooling fluid.

Figure 10:
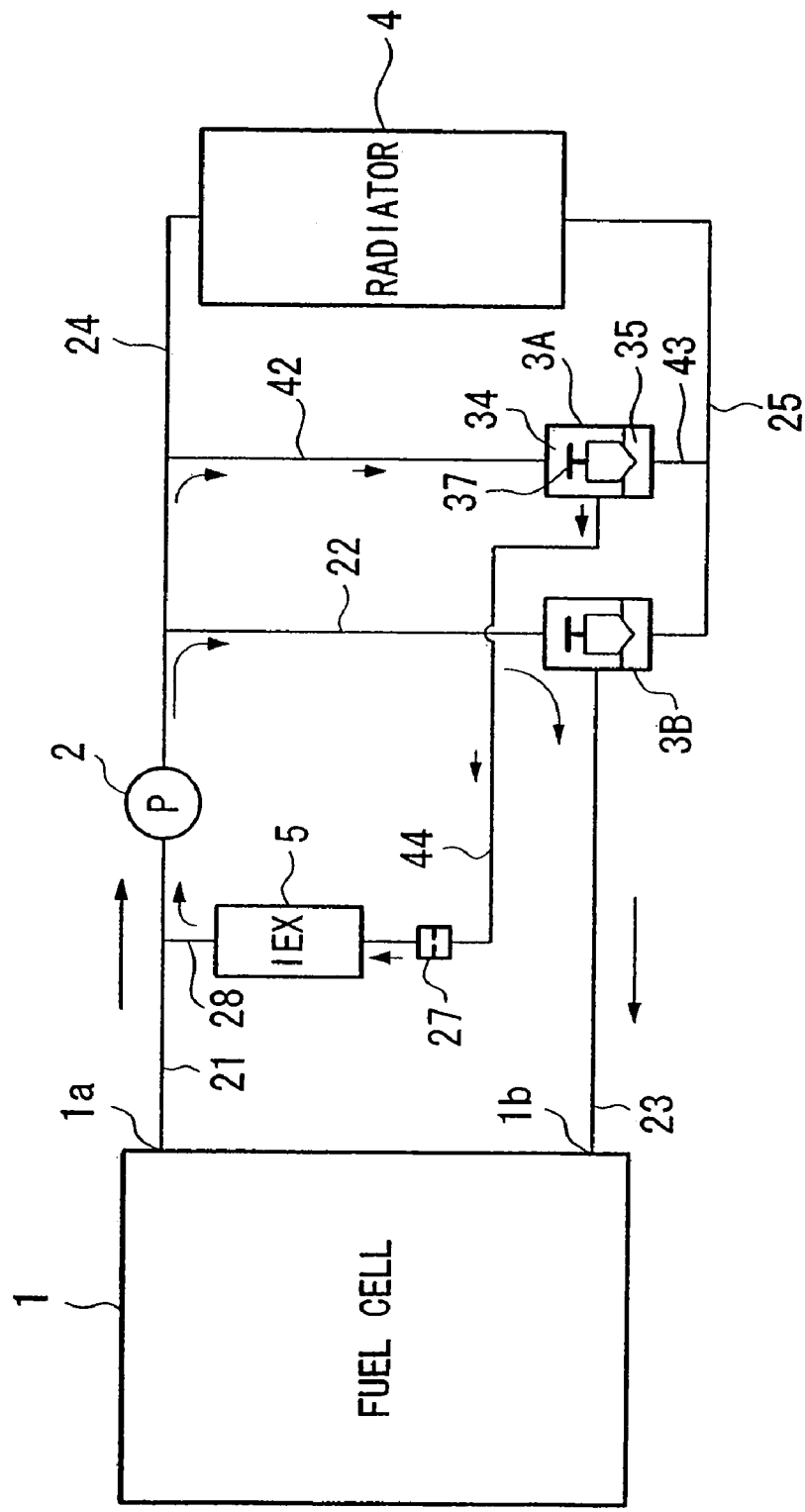
FIG. 10 is a system diagram showing a third embodiment of a fuel cell system to which the cooling method for a fuel cell according to the present invention is applicable, and specifically showing, as a first part, a flow state of the cooling fluid in a low temperature zone.

FIG. 10 shows the flow of the cooling fluid when the temperature of the cooling fluid is in the low temperature zone and below the thermostat operating temperature T1a' of the first thermostat valve 3A. In this state, both the thermostat valves 3A and 3B are in the completely closed state. Accordingly, the cooling fluid circulates in the cooling fluid circuit in the low temperature zone. The cooling fluid circuit in the low temperature zone is the same as in the second embodiment, and the cooling fluid flows from the cooling fluid passage outlet 1a of the fuel cell 1, through the cooling fluid piping 21, through the cooling fluid pump 2, through the cooling fluid piping 22, through the second thermostat valve 3B, through the cooling fluid piping 23, through the cooling fluid passage inlet 1b of the fuel cell 1, and through the fuel cell 1. At the same time, a portion of the cooling fluid flows through the cooling fluid piping 42, through the first valve chamber 34 of the second thermostat valve 3B, through the cooling fluid piping 44, through the orifice 27, through the ion exchanger 5 in which ions are removed, and through the cooling fluid piping 28, and is drawn by the cooling fluid pump 2 to circulate.

When the temperature of the cooling fluid is in the low temperature zone, and it exceeds the thermostat operating temperature T1a' of the first thermostat valve 3A, and is below the thermostat operating temperature T1b' of the second thermostat valve 3B, the second thermostat valve 3B is maintained in the completely closed state, and only the first thermostat valve 3A transitions to the completely open state. FIG. 11 shows the flow of the cooling fluid in this state in which the cooling fluid circulates in the cooling fluid circuit in the low temperature zone as described above, and a portion of the cooling fluid stops to flow through the cooling fluid piping 42 and the first thermostat valve 3A when the first thermostat valve 3A transitions into the completely open state; instead, another portion of the cooling fluid flowing into the cooling fluid piping 22 starts to flow through the cooling fluid piping 24, and through the radiator 4. As a result, the cooling fluid, which has been sitting in the radiator 4 and in the cooling fluid pipings 24 and 25 before the first thermostat valve 3A opens, and which has a relatively high ion concentration, flows through the cooling fluid pipings 25 and 43, through the second valve chamber 35 and the first valve chamber 34 of the first thermostat valve 3A, through the cooling fluid piping 44, through the orifice 27, and into the ion exchanger 5 in which ions contained in the cooling fluid are removed. Accordingly, it is possible to decrease the ion concentration in the cooling fluid, which has been sitting in the radiator 4 and in the cooling fluid pipings 24 and 25 before the first thermostat valve 3A opens, and which has a relatively high ion concentration, while preventing the cooling fluid with a high ion concentration from flowing into the fuel cell 1.

Advantageously, the thermostat operating temperature T1a' of the first thermostat valve 3A is set to an appropriate value, and the flow rate of the cooling fluid flowing through the cooling fluid piping 44 is set to an appropriate value, so that the cooling fluid in the radiator 4 and in the cooling fluid pipings 24 and 25 is completely replaced before the temperature of the cooling fluid reaches the thermostat operating temperature T1b' of the second thermostat valve 3B.

When the temperature of the cooling fluid exceeds the thermostat operating temperature T1b' of the second thermostat valve 3B, both of the thermostat valves 3A and 3B transition to the completely open state. FIG. 12 shows the flow of the cooling fluid in this state in which the cooling fluid circulates through the cooling fluid circuit in the high temperature zone. The cooling fluid circuit in the high temperature zone is the same as in the second embodiment, and the cooling fluid flows from the cooling fluid passage outlet 1a of the fuel cell 1, through the cooling fluid piping 21, through the cooling fluid pump 2, through the cooling fluid piping 22, through the cooling fluid piping 24, through the radiator 4, through the cooling fluid piping 25, through the second thermostat valve 3B, through the cooling fluid piping 23, through the cooling fluid passage inlet 1*b* of the fuel cell 1, and through the fuel cell 1 to circulate. At the same time, a portion of the cooling fluid flowing through the cooling fluid piping 25 flows through the cooling fluid piping 43, through the second valve chamber 35 and the first valve chamber 34 of the first thermostat valve 3A, through the cooling fluid piping 44, through the orifice 27, and into the ion exchanger 5; and is drawn by the cooling fluid pump 2 via the cooling fluid piping 28 to circulate.

When the cooling fluid starts to flow though the cooling fluid circuit in the high temperature zone, the radiator 4 and the cooling fluid pipings 24 and 25 have the cooling fluid having a low ion concentration, and the entire cooling fluid circuit has the cooling fluid having a low ion concentration; therefore, the cooling fluid having a low ion concentration, i.e., having a low conductivity, can be distributed to the fuel cell 1 immediately after the temperature of the cooling fluid transitions into the high temperature zone.

Thus, according to the third embodiment of the cooling method for a fuel cell, the electrical insulation performance of the cooling fluid in the fuel cell 1 can always be maintained within an acceptable range regardless of the temperature of the cooling fluid.

Modifications of the Above Embodiments

The present invention is not limited to the first to third embodiments explained above.

In the first to third embodiments explained above, the ion exchanger is disposed parallel to the fuel cell; however, the present invention will provide similar advantageous effects even when the ion exchanger is disposed in series with the fuel cell.

Next, the fourth and fifth embodiments of the cooling method for a fuel cell, according to the present invention, will be explained with reference to FIGS. 13 to 18. The cooling method for a fuel cell in each of the following embodiments will be explained as being applied to a fuel cell to be mounted in a fuel cell vehicle.

Fourth Embodiment

The fourth embodiment of the cooling method for a fuel cell, according to the present invention, will be explained with reference to FIGS. 13 to 15.

Figure 13:
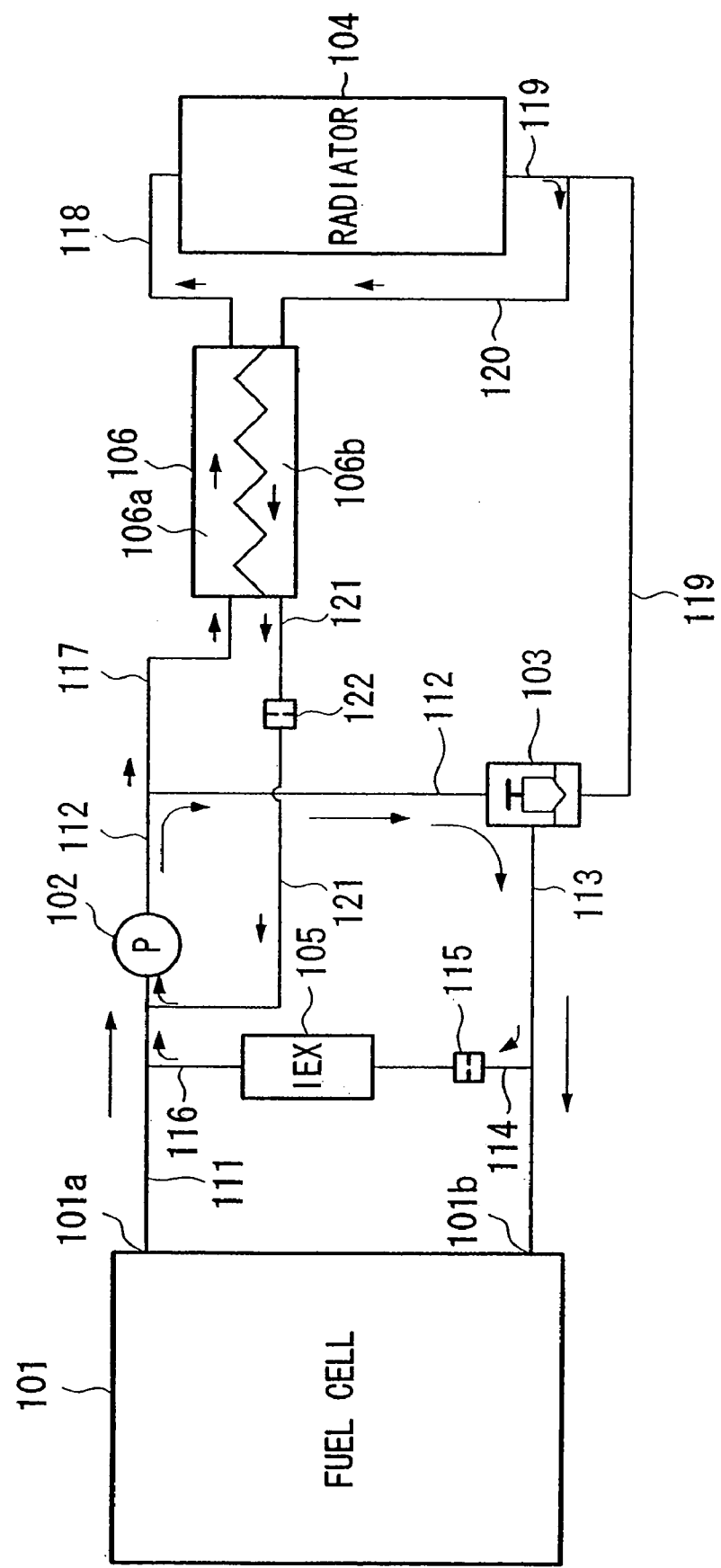
FIG. 13 is a system diagram showing a fourth embodiment of a fuel cell system to which the cooling method for a fuel cell according to the present invention is applicable, and specifically showing a flow state of the cooling fluid in a low temperature zone.
Figure 14:
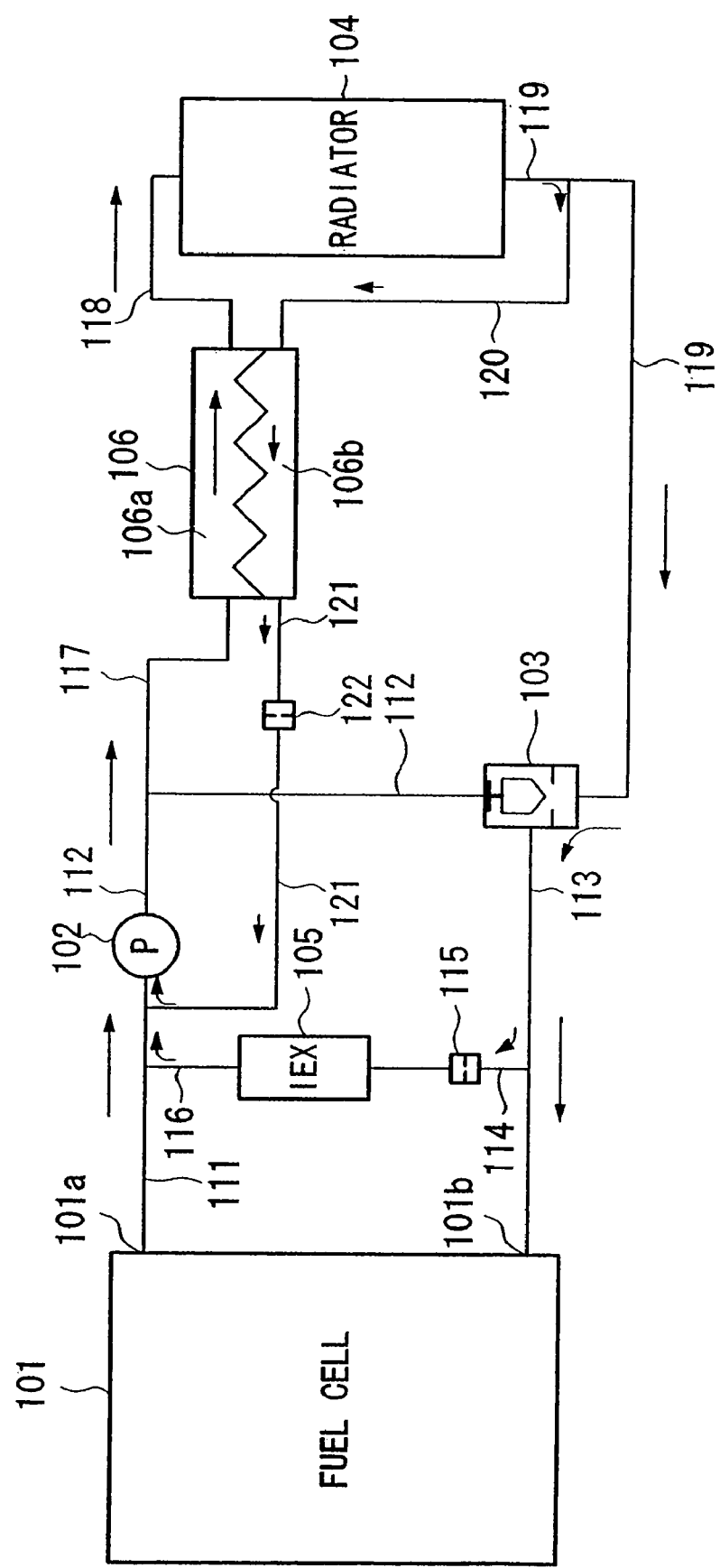
FIG. 14 is a system diagram showing the fourth embodiment of a fuel cell system, and specifically showing a flow state of the cooling fluid in a high temperature zone.

FIGS. 13 and 14 are schematic system diagrams showing a cooling system for a fuel cell mounted in a fuel cell vehicle.

A fuel cell 101 consists of a stack formed by stacking a plurality of fuel cell units, each of which comprises, for example: a solid polymer electrolyte membrane, such as a solid polymer ion-exchange membrane electrode or the like, sandwiched between an anode and a cathode; and a pair of separators holding the solid polymer electrolyte membrane therebetween. In the fuel cell 101, when hydrogen gas is supplied to the anode and oxygen-containing air is supplied to the cathode, hydrogen ions produced at the anode by a catalytic reaction move to the cathode through the solid polymer electrolyte membrane, and electrically and chemically react with oxygen at the cathode to generate electric power. In FIG. 13, the supply system and the discharge system for hydrogen gas and air are not shown.

In the fuel cell 101, cooling fluid passages are formed in the separators. The temperature of the fuel cell 101 is controlled so as to fall within a predetermined temperature range, e.g., from 70 to 80° C. after the fuel cell is warmed-up, by flowing a cooling fluid through the cooling fluid passages so as to directly cool the separators.

Next, a cooling fluid circulation system in which the cooling fluid flows will be explained. In the cooling system for a fuel cell in this embodiment, the main flow passages are switched by a thermostat valve 103; specifically, most of the cooling fluid is made to flow through the fuel cell 101 while detouring around a radiator 104 (a first heat exchanger) when the temperature of the cooling fluid is below a temperature (hereinafter, referred to as the low temperature zone) at which the thermostat valve operates (hereinafter, simply referred to as the thermostat operating temperature), most of the cooling fluid is made to flow through the radiator 104 in which the cooling fluid is cooled; then, is made to flow through the fuel cell 101 when the temperature of the cooling fluid exceeds the thermostat operating temperature (hereinafter, referred to as the low temperature zone).

The operation of the thermostat valve 103 will be explained with reference to FIG. 15.

Figure 15A:
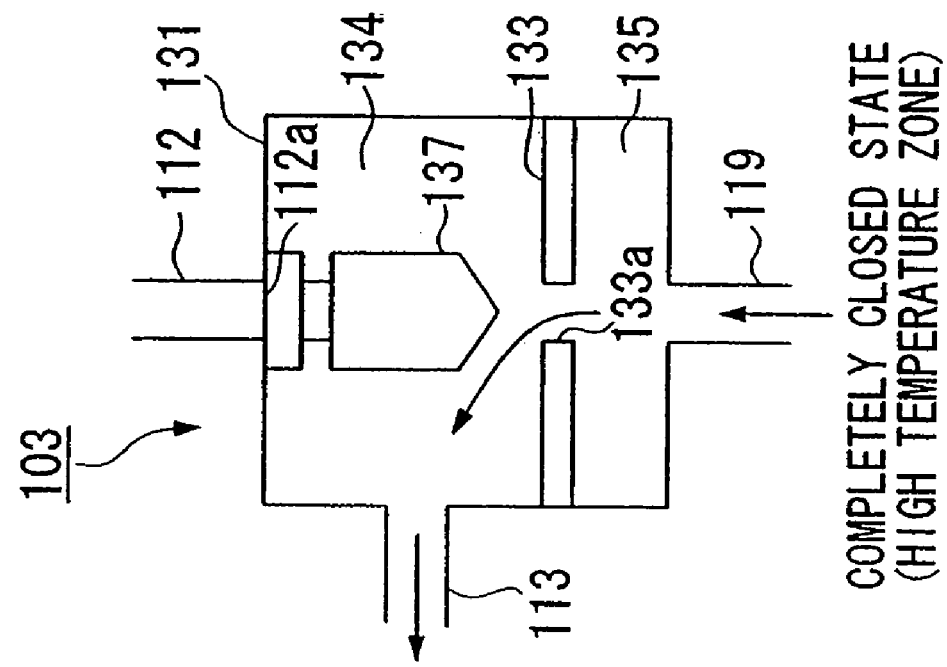
FIGS. 15A and 15B are diagrams showing the operation of a thermostat valve used in the fourth embodiment.
Figure 15B:
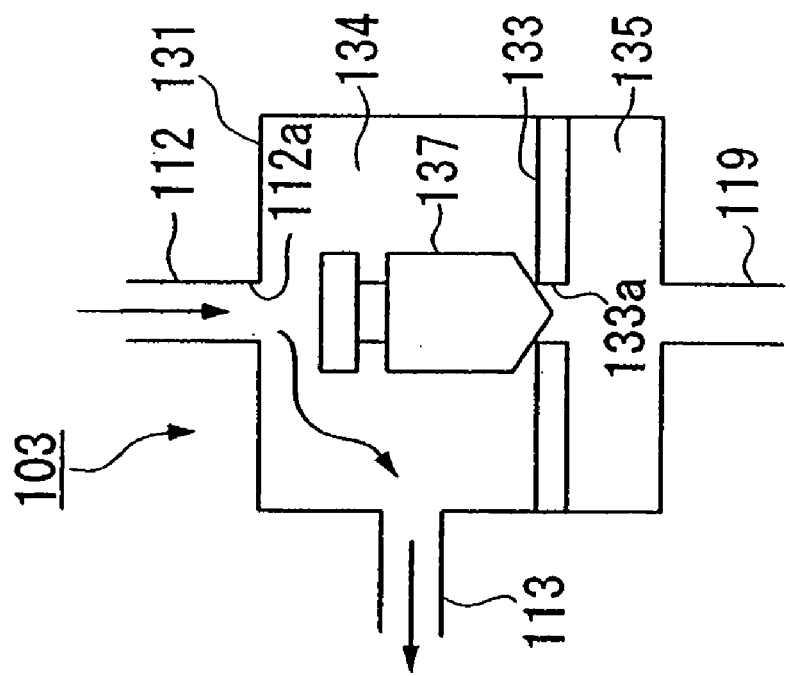

The thermostat valve 103 comprises: a housing 131 defining a valve chamber therein; a partition 133 dividing the valve chamber into two valve chambers, i.e., a first valve chamber 134 and a second valve chamber 135; and a valve body 137 operable to open or close a communication hole 133*a* formed in the partition 133, so as to connect or disconnect the first valve chamber 34 and the second valve chamber 135. In addition, the thermostat valve 103 has a thermostat (not shown) therein, which operates the valve body 137 in accordance with the temperature of the cooling fluid flowing through the valve chamber. The thermostat valve 103 operates as follows: the valve body 137 closes the communication hole 33*a*, as shown in FIG. 15A (hereinafter, this state is referred to as the completely closed state), when the temperature of the cooling fluid is below a temperature at which the thermostat operates (hereinafter simply referred to as the thermostat operating temperature), i.e., when the temperature of the cooling fluid is in the low temperature zone; and the valve body 137 is separated from the communication hole 133*a*, as shown in FIG. 15B (hereinafter, this state is referred to as the completely open state), when the temperature of the cooling fluid exceeds the thermostat operating temperature, i.e., when the temperature of the cooling fluid is in the high temperature zone. The thermostat will not be explained herein because it is well known.

Cooling fluid pipings 112 and 113 are connected to the first valve chamber 134, and a cooling fluid piping 119 is connected to the second valve chamber 135.

Accordingly, when the temperature of the cooling fluid is in the low temperature zone and the thermostat valve 103 is in the completely closed state as shown in FIG. 15A, the cooling fluid flows into the first valve chamber 134 through the cooling fluid piping 112, and flows out to the cooling fluid piping 113. In this state, the cooling fluid piping 119 is closed at the second valve chamber 135.

On the other hand, when the temperature of the cooling fluid is in the high temperature zone and the thermostat valve 103 is in the completely open state as shown in FIG. 15B, the cooling fluid flows into the second valve chamber 135 through the cooling fluid piping 119, and flows out to the cooling fluid piping 113 via the first valve chamber 134. In this state, the cooling fluid does not flow into the first valve chamber 134 through the cooling fluid piping 112 because the valve body 37 closes the inlet 112*a* from the cooling fluid piping 112 into the first valve chamber 34.

As explained above, the thermostat valve 103 switches the cooling fluid circuit in such a way that the valve body 137 operates so as to open or close the communication hole 133a and the inlet 112a from the cooling fluid piping 112.

Next, the cooling fluid circuit in a state, in which the cooling fluid for the fuel cell 101 requires no cooling because the temperature of the cooling fluid is low, i.e., the temperature of the cooling fluid is in a low temperature zone, will be explained. As shown in FIG. 13, the cooling fluid discharged from the cooling fluid passage outlet 1a of the fuel cell 101 is drawn by a cooling fluid pump 102 via the cooling fluid piping 111, flows into the thermostat valve 103 via the cooling fluid piping 112 after being pressurized by the cooling fluid pump 102, flows into the cooling fluid passage inlet 1b of the fuel cell 101 via the cooling fluid piping 113, flows through the cooling fluid passages in the fuel cell 101, and is again discharged from the cooling fluid passage outlet 101a to circulate. This is the main flow circuit for the cooling fluid in the low temperature, and most of the cooling fluid circulates through the fuel cell 101 via the main flow circuit.

When the temperature of the cooling fluid is in the low temperature zone, a portion of the cooling fluid flowing through the cooling fluid piping 113 flows into an ion exchanger 105 via a cooling fluid piping 114 and an orifice 115. The ion exchanger 105 is filled with ion exchange resin in order to remove ions contained in the cooling fluid so as to decrease the conductivity of the cooling fluid. The orifice 115 is a regulating orifice which regulates the flow rate of the cooling fluid flowing into the ion exchanger 105 at a predetermined rate. The cooling fluid, from which ions have been removed by the ion exchanger 105, flows into a cooling fluid piping 111 via a cooling fluid piping 116, and is drawn by the cooling fluid pump 102 to circulate. Accordingly, when the temperature of the cooling fluid is in the low temperature zone, because a portion of the cooling fluid circulating through the fuel cell 101 always flows through the ion exchanger 105 which removes ions, it is possible to maintain the ion concentration in the cooling fluid circulating through the fuel cell 101 to be below a predetermined level; thus, the conductivity of the cooling fluid can be maintained to be below a predetermined level, and the electrical insulation performance of the cooling fluid in the fuel cell 101 can be ensured.

In addition, when the temperature of the cooling fluid is in the low temperature zone, a portion of the cooling fluid flowing through the cooling fluid piping 112 flows into a primary fluid passage 106a of another heat exchanger 106 (a second heat exchanger) via a cooling fluid piping 117; then, the cooling fluid discharged from the primary fluid passage 106a flows into the radiator 104 via a cooling fluid piping 118. The radiator 104 is an air-cooled type heat exchanger in which the cooling fluid is cooled by heat dissipation using natural ventilation or forced draft by a fan. The cooling fluid discharged from the radiator 104 flows into a secondary fluid passage 106b of the heat exchanger 106 via the cooling fluid pipings 119 and 120. The cooling fluid discharged from the secondary fluid passage 106b returns to the cooling fluid piping 111 via a cooling fluid piping 121 and an orifice 122, and then is drawn by the cooling fluid pump 102 to circulate. Note that the flow rate of the cooling fluid flowing through the radiator 104 is limited to a small value by the orifice 122.

In this state, the cooling fluid does not flow from the cooling fluid piping 119 into the first valve chamber 134 via the second valve chamber 135 because the thermostat valve 103 is in the completely closed state, i.e., the communication hole 33a of the thermostat valve 103 is closed by the valve body 137.

The heat exchanger 106 is a counterflow type heat exchanger in which the cooling fluid in the primary fluid passage 106a flows oppositely to the cooling fluid in the secondary fluid passage 106b, and in which heat is transferred between the cooling fluid flowing through the primary fluid passage 106a and the cooling fluid flowing through the secondary fluid passage 106b.

The advantageous effects, which can be obtained by making a portion of the cooling fluid flow through the radiator 104 when the temperature of the cooling fluid is in the low temperature zone, will be explained below. When the temperature of the cooling fluid is in the low temperature zone, and if the cooling fluid is not distributed to the radiator 104, the ion concentration and the conductivity of the cooling fluid may be increased due to ions which may dissolve from the radiator 104, because the cooling fluid is sitting in the radiator 104. Accordingly, the electrical insulation performance of the cooling fluid in the fuel cell 101 could be degraded because a large amount of cooling fluid, which has been sitting in the radiator 104, and which has a high conductivity, flows into the cooling fluid passages in the fuel cell 101 through the cooling fluid piping 113 when the temperature of the cooling fluid transitions from the low temperature zone into the high temperature zone, and consequently the thermostat valve 103 switches from the closed state to the open state.

If a portion of the cooling fluid is made to flow through the radiator 104 even when the temperature of the cooling fluid is in the low temperature zone, as in this embodiment, sitting of the cooling fluid in the radiator 104 can be prevented, and consequently an increase in the ion concentration in the cooling fluid in the radiator 104 can also be prevented. The cooling fluid discharged from the radiator 104 returns to an upstream point, as viewed from the cooling fluid pump 102, on the cooling fluid piping 11, at which the cooling fluid is mixed with another portion of the cooling fluid flowing through the main flow passage. Because a portion of the cooling fluid flowing through the main flow passage flows through the ion exchanger 105 as explained above, it can be said that a portion of the cooling fluid discharged from the radiator 104 flows through the ion exchanger 105. That is, a portion of the cooling fluid flows through the radiator 104 and through the ion exchanger 105 when the temperature of the cooling fluid is in the low temperature zone, whereby ions contained in the cooling fluid in the radiator 104 are removed.

Accordingly, even when the temperature of the cooling fluid is in the low temperature zone, it is possible to maintain the ion concentration in the cooling fluid in the radiator 104 to be below an appropriate level; thus, the conductivity of the cooling fluid can be maintained to be below a predetermined level.

The advantageous effects, which can be obtained by transferring heat between the cooling fluid flowing into the radiator 104, i.e., the cooling fluid flowing through the primary fluid passage 106a, and the cooling fluid discharged from the radiator 104, i.e., the cooling fluid flowing through the secondary fluid passage 106b, will be explained below.

If the heat exchanger 106 is not provided, the cooling fluid which was heated by the heat of the fuel cell 101 flows into the radiator 104, and the cooling fluid is cooled by heat dissipation while flowing through the radiator 104; however, when the fuel cell 101 is operated in a cold environment or is operated so as to generate a small amount of power, the cooling fluid is cooled to quite a low temperature, and the cooling fluid having quite a low temperature returns to the upstream point as viewed from the cooling fluid pump 102 at which the cooling fluid is mixed with another portion of the cooling fluid flowing through the main flow passage. As a result, although the flow rate of the cooling fluid having quite a low temperature is low, this cooling fluid strongly influences the temperature of the cooling fluid flowing through the main flow passage, the temperature of the cooling fluid supplied to the fuel cell 101 is decreased, and the fuel cell 101 may be excessively cooled; consequently, the temperature of the fuel cell 101 may be outside of an appropriate range.

On the other hand, when the heat exchanger 106 is provided, because the cooling fluid which was heated by the heat of the fuel cell 101 flows into the primary fluid passage 106a, and the cooling fluid discharged from the radiator 104 flows through the secondary fluid passage 106b, the heat of the cooling fluid flowing through the primary fluid passage 106a is transferred to the cooling fluid flowing through the secondary fluid passage 106b. As a result, the temperature of the cooling fluid flowing through the primary fluid passage 106a is decreased, and the temperature of the cooling fluid flowing through the secondary fluid passage 106b is increased, whereby difference in temperatures thereof is decreased. As a result, the amount of heat dissipated from the radiator 104 is also decreased.

Accordingly, when there is provided the heat exchanger 106, a portion of the cooling fluid, which is mixed with another portion of the cooling fluid flowing through the main flow passage after flowing through the radiator 104, exerts little influence on the temperature of the cooling fluid flowing through the main flow passage; therefore, the temperature of the cooling fluid supplied to the fuel cell 101 is not decreased, and the fuel cell 101 will not be excessively cooled; consequently, the temperature of the fuel cell 101 can be maintained within an appropriate range.

Next, the cooling fluid circuit in a state, in which the cooling fluid for the fuel cell 101 requires cooling because the temperature of the cooling fluid is high, i.e., the temperature of the cooling fluid is in a high temperature zone, will be explained.

In this state, because the thermostat valve 103 is in the completely open state as shown in FIG. 14, the cooling fluid discharged from the cooling fluid passage outlet 101a of the fuel cell 101 and pressurized by the cooling fluid pump 102 flows into a radiator 104 via the cooling fluid piping 112, the cooling fluid piping 117, the primary fluid passage 106a of the heat exchanger 106, and the cooling fluid piping 118. The cooling fluid cooled through the radiator 104 flows into the thermostat valve 103 via the cooling fluid piping 119, and flows into the cooling fluid passage inlet 101b of the fuel cell 101 via the cooling fluid piping 113 to circulate. This is the main flow passage for the cooling fluid in the high temperature zone through which most of the cooling fluid flows to circulate through the fuel cell 101. When the temperature of the cooling fluid is in a high temperature zone, the cooling fluid does not flow into the first valve chamber 134 through the cooling fluid piping 112 because the inlet 112a from the cooling fluid piping 112 is closed.

Even when the temperature of the cooling fluid is in the high temperature zone, a portion of the cooling fluid flowing through the cooling fluid piping 113 flows into the ion exchanger 105 via the cooling fluid piping 114 and the orifice 115. The cooling fluid, from which ions have been removed by the ion exchanger 105, flows into the cooling fluid piping 111 via the cooling fluid piping 116, and is drawn by the cooling fluid pump 102 to circulate. Accordingly, even when the temperature of the cooling fluid is in the high temperature zone, because a portion of the cooling fluid circulating through the fuel cell 101 always flows through the ion exchanger 105 which removes ions, it is possible to maintain the ion concentration in the cooling fluid circulating through the fuel cell 101 to be below a predetermined level; thus, the conductivity of the cooling fluid can be maintained to be below a predetermined level, and the electrical electrical insulation performance of the cooling fluid in the fuel cell 101 can be ensured.

When the temperature of the cooling fluid is in the high temperature zone, a portion of the cooling fluid discharged from the radiator 104 flows into the secondary fluid passage 106b of the heat exchanger 106 via the cooling fluid piping 120, and returns to the cooling fluid piping 111 via the cooling fluid piping 121 and the orifice 122. Because the flow rate of the cooling fluid returning to the cooling fluid piping 111 is regulated by the orifice 122, the amount of the cooling fluid returning to the cooling fluid piping 111 is much less than that of the cooling fluid flowing through the main flow passage, and because the heat loss in the heat exchanger 106 is very small, the cooling performance of the radiator 6 is hardly influenced.

As explained above, even when the temperature of the cooling fluid transitions from the low temperature zone into the high temperature zone, the thermostat valve 103 instantaneously switches from the closed state to the open state, and consequently the cooling fluid circuit instantaneously switches from one in the low temperature zone to the other in the high temperature zone, the cooling fluid having a low ion concentration, i.e., having a low conductivity, can be distributed to the fuel cell 101 immediately after the temperature of the cooling fluid transitions into the high temperature zone because the ion concentration in the cooling fluid in the radiator 104 is maintained to be low since the temperature of the cooling fluid was in the low temperature zone.

Therefore, according to the fourth embodiment of the cooling method for a fuel cell, the electrical insulation performance of the cooling fluid in the fuel cell 101 can always be maintained within an acceptable range regardless of the temperature of the cooling fluid, and the fuel cell 101 will not be excessively cooled; consequently, the temperature of the fuel cell 101 can be maintained within an appropriate range.

Fifth Embodiment

The fifth embodiment of the cooling method for a fuel cell, according to the present invention, will be explained with reference to FIGS. 16 and 17.

Figure 16:
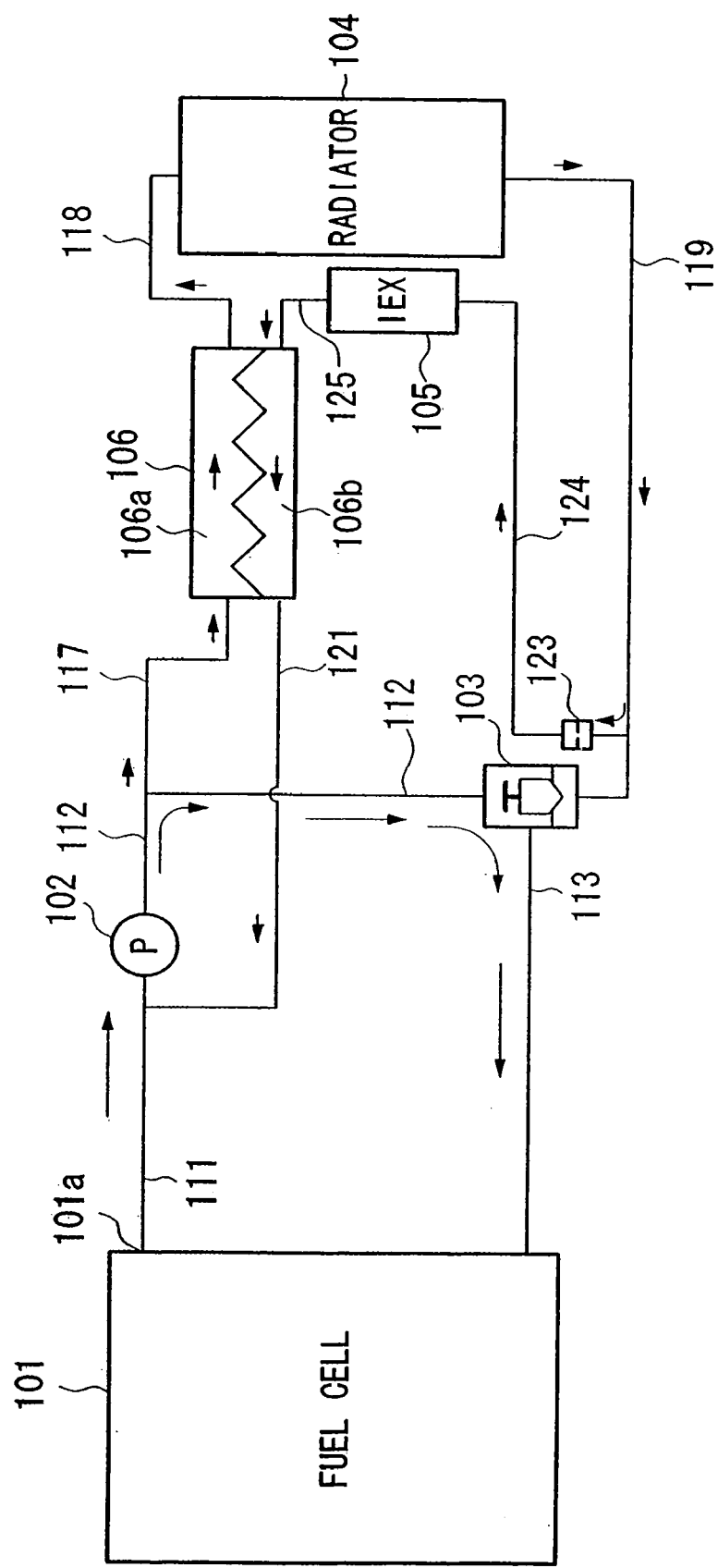
FIG. 16 is a system diagram showing a fifth embodiment of a fuel cell system to which the cooling method for a fuel cell according to the present invention is applicable, and specifically showing a flow state of the cooling fluid in a low temperature zone.
Figure 17:
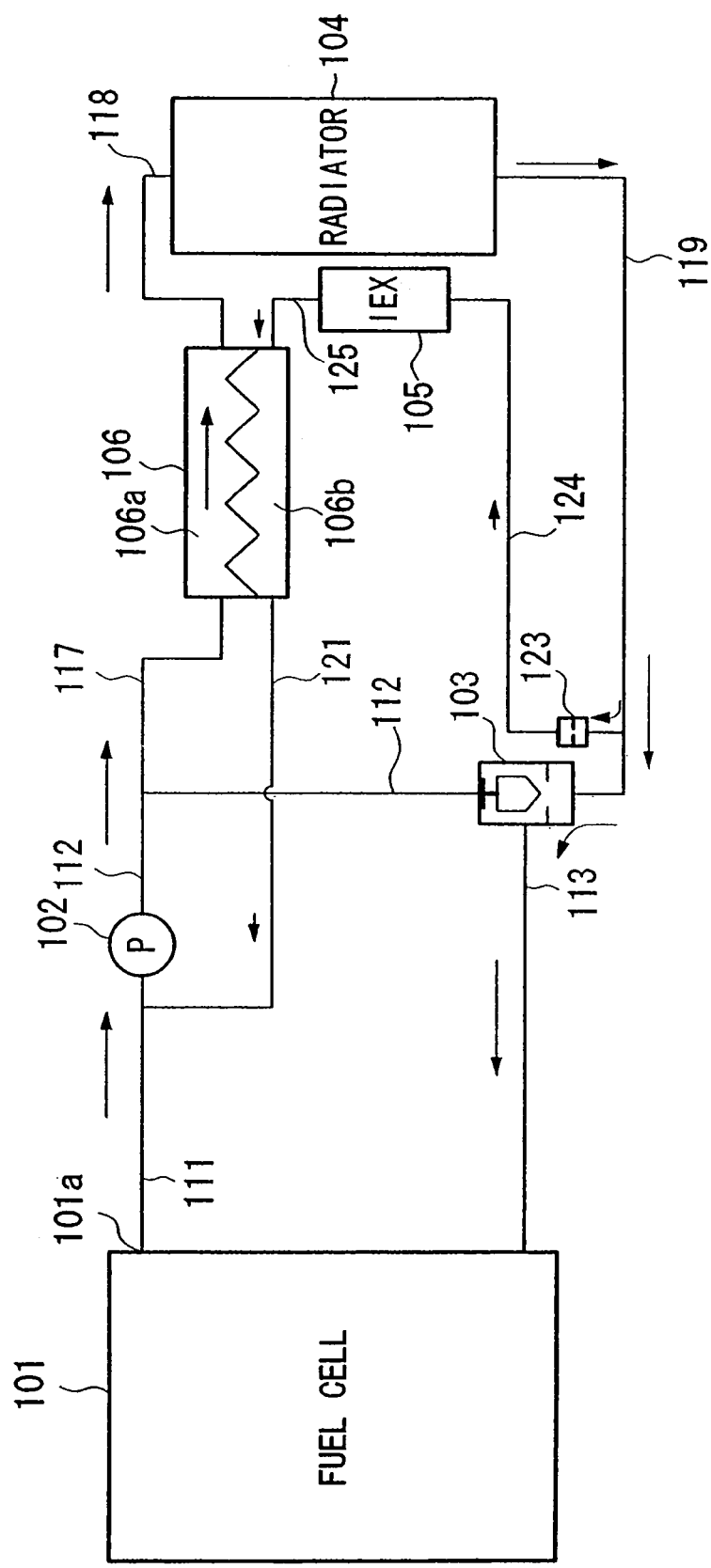
FIG. 17 is a system diagram showing the fifth embodiment of a fuel cell system, and specifically showing a flow state of the cooling fluid in a high temperature zone.

FIGS. 16 and 17 are schematic system diagrams showing a cooling system for a fuel cell according to the fifth embodiment.

The features in the fifth embodiment of the cooling system for a fuel cell which are different from that in the fourth embodiment will be explained below.

In the fifth embodiment, the ion exchanger 105 is not disposed between the cooling fluid piping 111 and the cooling fluid piping 113, but is instead disposed between the cooling fluid piping 111 and the cooling fluid piping 119. More specifically, a cooling fluid piping 124 having an orifice 123 is connected to the cooling fluid piping 119 disposed immediately upstream from the thermostat valve 103, and the cooling fluid piping 124 is further connected to the ion exchanger 105. Furthermore, the ion exchanger 105 is connected to the inlet of the secondary fluid passage 106b of the heat exchanger 106 via a cooling fluid piping 125, and the outlet of the secondary fluid passage 106b is connected to the cooling fluid piping 111 via a cooling fluid piping 121.

Other features are the same as in the fourth embodiment; therefore, the same reference symbols are appended to the same elements, and explanations thereof are omitted.

Next, the flow of the cooling fluid in the fifth embodiment will be explained below.

First, the flow of the cooling fluid when the temperature of the cooling fluid is in the low temperature zone will be explained with reference to FIG. 16. In this state, the main flow passage for the cooling fluid is the same as in the fourth embodiment. The cooling fluid flows from the cooling fluid passage outlet 101a of the fuel cell 101, through the cooling fluid piping 11, through the cooling fluid pump 102, through the cooling fluid piping 112, through the thermostat valve 103, through the cooling fluid piping 113, through the cooling fluid passage inlet 101b of the fuel cell 101, and through the fuel cell 101.

In this state, a portion of the cooling fluid flows into the primary fluid passage 106a of the heat exchanger 106, and the cooling fluid discharged from the primary fluid passage 106a is distributed to the radiator 104 via the cooling fluid piping 118. The cooling fluid discharged from the radiator 104 is distributed to the ion exchanger 105 via the cooling fluid piping 119, the orifice 123, and the cooling fluid piping 124. The cooling fluid, from which ions have been removed by the ion exchanger 105, flows into the secondary fluid passage 106b of the heat exchanger 106 via the cooling fluid piping 125, and the cooling fluid discharged from the secondary fluid passage 106b returns to the cooling fluid piping 111 via the cooling fluid piping 121, and is drawn by the cooling fluid pump 102 to circulate. In other words, in the fifth embodiment, the ion exchanger 105 and the secondary fluid passage 106b of the heat exchanger 106 are connected in series, and a certain portion of the cooling fluid flows into the secondary fluid passage 106b after flowing through the ion exchanger 105.

In the fifth embodiment, as in the previous embodiment, because a portion of the cooling fluid flows through the radiator 104 when the temperature of the cooling fluid is in the low temperature zone, sitting of the cooling fluid in the radiator 104 can be prevented, and consequently an increase in the ion concentration in the cooling fluid in the radiator 104 can also be prevented. In addition, because the cooling fluid discharged from the radiator 104 is made to flow through the ion exchanger 105, ions contained in the cooling fluid in the radiator 104 can be removed. Therefore, even when the temperature of the cooling fluid is in the low temperature zone, the ion concentration in the cooling fluid in the radiator 104 can be suppressed to be low, while the ion concentration in the cooling fluid circulating through the fuel cell 101 can be maintained below a predetermined level.

In the fifth embodiment, as in the previous embodiment, because heat is transferred between relatively warm cooling fluid flowing into the radiator 104 and relatively cold cooling fluid discharged from the radiator 104, and because the difference in the temperatures thereof can be decreased, the amount of heat dissipated from the radiator 104 can be decreased. Accordingly, a decrease in the temperature of the cooling fluid distributed to the fuel cell 101 can be preferably prevented, and an excessive cooling of the fuel cell 101 can also be prevented; consequently, the temperature of the fuel cell 101 can be maintained within an appropriate range, even when a portion of the cooling fluid discharged from the radiator 104 and the heat exchanger 106 is mixed with another portion of the cooling fluid flowing through the main flow passage.

Next, the cooling fluid circuit in a state in which the temperature of the cooling fluid is in a high temperature zone will be explained with reference to FIG. 17. In this state, the main flow passage for the cooling fluid is the same as in the fourth embodiment. The cooling fluid discharged from the cooling fluid passage outlet 101a of the fuel cell 101 flows through the cooling fluid pump 102, through the cooling fluid piping 112, through the cooling fluid piping 117, through the primary flow passage 106a of the heat exchanger 106, through the cooling fluid piping 118, through the radiator 104, through the cooling fluid piping 119, through the thermostat valve 103, and through the cooling fluid piping 113, and flows into the cooling fluid passage inlet 101b of the fuel cell 101 to circulate.

In this state, as in the previous state, a portion of the cooling fluid flowing through the cooling fluid piping 119 flows into the ion exchanger 105 via the orifice 123 and the cooling fluid piping 124. The cooling fluid, from which ions have been removed by the ion exchanger 105, flows into the secondary flow passage 106b of the heat exchanger 106 via the cooling fluid piping 125. The cooling fluid discharged from the secondary flow passage 106b returns to the cooling fluid piping 111 via the cooling fluid piping 121, and is drawn by the cooling fluid pump 102 to circulate. Accordingly, even when the temperature of the cooling fluid is in the high temperature zone, because a portion of the cooling fluid circulating through the fuel cell 101 always flows through the ion exchanger 105 which removes ions, it is possible to maintain the ion concentration in the cooling fluid circulating through the fuel cell 101 to be below a predetermined level; thus, the conductivity of the cooling fluid can be maintained to be below a predetermined level.

Therefore, in the fifth embodiment, as in the previous embodiment, even when the temperature of the cooling fluid transitions from the low temperature zone into the high temperature zone, the thermostat valve 103 instantaneously switches from the closed state to the open state, and consequently the cooling fluid circuit instantaneously switches from one in the low temperature zone to the other in the high temperature zone, the cooling fluid having a low ion concentration, i.e., having a low conductivity, can be distributed to the fuel cell 101 immediately after the temperature of the cooling fluid transitions into the high temperature zone because the ion concentration in the cooling fluid in the radiator 104 is maintained to be low since the temperature of the cooling fluid was in the low temperature zone.

Furthermore, in the fifth embodiment, because the ion exchanger 105 and the secondary fluid passage 106b of the heat exchanger 106 are connected in series, the amount of the cooling fluid, which was cooled by the radiator 104 and which circulates detouring around the fuel cell 101, can be decreased compared with the fourth embodiment when the temperature of the cooling fluid is in the high temperature zone. In other words, more cooling fluid which has been cooled by the radiator 104 can be distributed to the fuel cell 101; therefore, the fuel cell 101 can be more effectively cooled.

As explained above, according to the fifth embodiment of the cooling method for a fuel cell, the electrical insulation performance of the cooling fluid in the fuel cell 101 can always be maintained within an acceptable range regardless of the temperature of the cooling fluid, and the fuel cell 101 will not be excessively cooled; consequently, the temperature of the fuel cell 101 can be maintained within an appropriate range.

Modifications of the Above Embodiments

The present invention is not limited to the fourth and fifth embodiments explained above.

Figure 18:
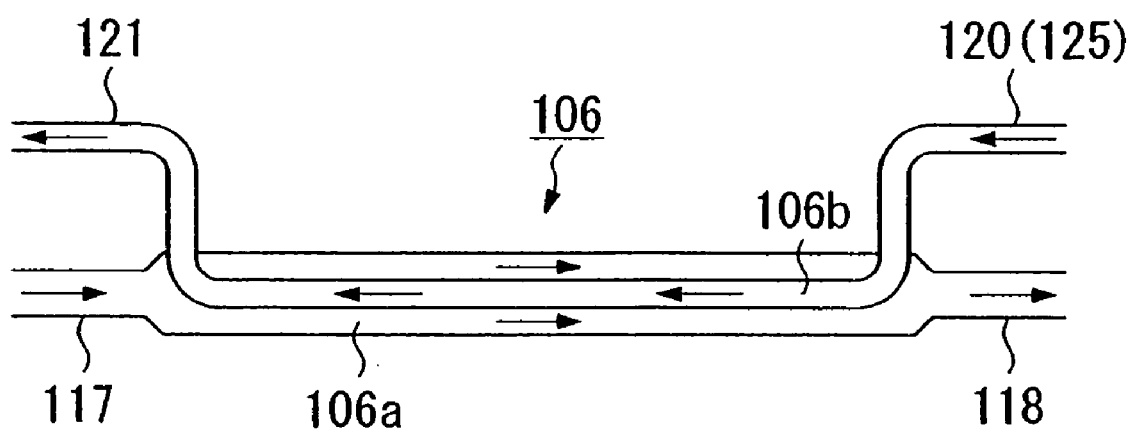
FIG. 18 is a diagram showing an example of the structure of a second heat exchanger 6.

For example, the structure of the heat exchanger 106 is not limited; and a heat exchanger having a dual tube structure, in which the secondary flow passage 106b is disposed inside the primary flow passage 106a, as shown in FIG. 18, may be employed.

Furthermore, the switching means to switch the cooling fluid circuit between one in the low temperature zone and the other in the high temperature zone is not limited to a thermostat valve; and the means may comprise a temperature sensor, and a valve which is controlled to be open or closed in accordance with the output of the temperature sensor.

INDUSTRIAL APPLICABILITY

As explained above, according to the first aspect of the present invention, even if the ion concentration in the cooling fluid in the heat exchanger is increased when the temperature of the cooling fluid is below the thermostat operating temperature, this portion of the cooling fluid having a high ion concentration can be distributed to the fuel cell after being diluted with another portion of the cooling fluid whose ion concentration has been decreased; therefore, the following advantageous effects are obtainable: introduction of the cooling fluid having a high ion concentration into the fuel cell is prevented, and the fuel cell is maintained in an electrically stable state.

According to the second aspect of the present invention, even if the ion concentration in the cooling fluid in the heat exchanger is increased when the temperature of the cooling fluid is below the thermostat operating temperature, the ion concentration of this portion of the cooling fluid having a high ion concentration can be decreased by removing ions before the cooling fluid reaches the thermostat operating temperature; therefore, the following advantageous effects are obtainable: the cooling fluid having a low ion concentration can be distributed to the fuel cell immediately after the cooling fluid starts to circulate through the fuel cell and the heat exchanger, and the fuel cell is maintained in an electrically stable state.

In addition, according to the present invention, because the cooling fluid is not distributed to the ion exchanger from the heat exchanger, and it is possible to increase the amount of the cooling fluid distributed to the fuel cell after being discharged from the heat exchanger, the cooling capacity for the fuel cell can be increased.

According to the third aspect of the present invention, even if the ion concentration in the cooling fluid in the heat exchanger is increased when the temperature of the cooling fluid is below the operating temperature of the first thermostat, the ion concentration of this portion of the cooling fluid having a high ion concentration can be decreased by removing ions before the cooling fluid reaches the operating temperature of the second thermostat; therefore, the following advantageous effects are obtainable: the cooling fluid having a low ion concentration can be distributed to the fuel cell immediately after the cooling fluid starts to circulate through the fuel cell and the heat exchanger, and the fuel cell is maintained in an electrically stable state.

According to the fourth aspect of the present invention, because a portion of the cooling fluid is made to flow through the first heat exchanger and the ion exchanger to remove ions contained in the cooling fluid in the first heat exchanger when the temperature of the cooling fluid is below a predetermined temperature, the cooling fluid does not sit in the first heat exchanger, and the ion concentration in the cooling fluid in the first heat exchanger can be decreased; therefore, the following advantageous effects are obtainable: the electrical insulation performance of the cooling fluid in the fuel cell can be preferably maintained, and the fuel cell is maintained in an electrically stable state.

Furthermore, according to the present invention, even if a portion of the cooling fluid is made to flow through the first heat exchanger and the ion exchanger to remove ions contained in the cooling fluid in the first heat exchanger when the temperature of the cooling fluid is below the predetermined temperature, the amount of heat dissipated in the first heat exchanger is maintained to be low; therefore, the cooling fluid is prevented from being excessively cooled, and an excessive cooling of the fuel cell can be prevented; consequently, the temperature of the fuel cell can be maintained within an appropriate range.

We claim:

1. A cooling method for a fuel cell, in which heat produced during power generation in said fuel cell is dissipated by circulating a cooling fluid and by using a heat exchanger and a thermostat provided for switching flow passages of said cooling fluid depending on the temperature thereof, the method comprising the steps of:

providing an ion exchanger, for removing ions contained in said cooling fluid, in a circulation system for said cooling fluid;

removing ions contained in said cooling fluid by circulating said cooling fluid through said fuel cell and said ion exchanger while allowing a portion of said cooling fluid to substantially stand in said heat exchanger when the temperature of said cooling fluid is below a thermostat operating temperature at which the thermostat valve of said thermostat is operated;

removing ions contained in said cooling fluid in said heat exchanger by circulating a portion of said cooling fluid through said heat exchanger and said ion exchanger, when the temperature of said cooling fluid is approaching said thermostat operating temperature; and cooling said fuel cell by circulating said cooling fluid through said fuel cell and said heat exchanger after the temperature of said cooling fluid reaches said thermostat operating temperature.

2. A cooling method for a fuel cell according to claim 1, further comprising the steps of:

providing a conductivity sensor for measuring the conductivity of said cooling fluid; and stopping the step of removing ions contained in said cooling fluid in said heat exchange by circulating a portion of said cooling fluid through said heat exchanger and said ion exchanger when the conductivity of said cooling fluid is decreased below a predetermined value.

3. A cooling method for a fuel cell, in which heat produced during power generation in said fuel cell is dissipated by circulating a cooling fluid and by using a heat exchanger and first and second thermostats provided for switching flow passages of said cooling fluid depending on the temperature thereof, the method comprising the steps of:

providing an ion exchanger, for removing ions contained in said cooling fluid, in a circulation system for said cooling fluid;

removing ions contained in said cooling fluid by circulating said cooling fluid through said fuel cell and said ion exchanger while allowing a portion of said cooling fluid to substantially stand in said heat exchanger when the temperature of said cooling fluid is below a first thermostat operating temperature at which the thermostat valve of said first thermostat is operated;

removing ions contained in said cooling fluid in said heat exchanger by circulating a portion of said cooling fluid through said heat exchanger and said ion exchanger, when the temperature of said cooling fluid is above said first thermostat operating temperature and below a second thermostat operating temperature at which the thermostat valve of said second thermostat is operated; and cooling said fuel cell by circulating said cooling fluid through said fuel cell and said heat exchanger after the temperature of said cooling fluid reaches said second thermostat operating temperature.

* * * * *